United States Patent
Kubby et al.

(10) Patent No.: US 6,990,265 B2
(45) Date of Patent: Jan. 24, 2006

(54) MONOLITHIC RECONFIGURABLE OPTICAL MULTIPLEXER SYSTEMS AND METHODS

(75) Inventors: Joel A. Kubby, Rochester, NY (US); Pinyen Lin, Rochester, NY (US); Jingkuang Chen, Rochester, NY (US); Yi Su, Portland, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/721,849

(22) Filed: Nov. 25, 2003

(65) Prior Publication Data

US 2004/0114856 A1 Jun. 17, 2004

Related U.S. Application Data

(62) Division of application No. 09/986,395, filed on Nov. 8, 2001, now Pat. No. 6,658,179.

(51) Int. Cl.
  *G02B 6/26* (2006.01)
(52) U.S. Cl. .......................................... 385/16; 385/19
(58) Field of Classification Search ............ 385/16–24
  See application file for complete search history.

(56) References Cited

U.S. PATENT DOCUMENTS

| | | | |
|---|---|---|---|
| 4,859,022 A * | 8/1989 | Opdahl et al. ................. 385/21 |
| 5,002,350 A | 3/1991 | Dragone | |
| 5,002,354 A | 3/1991 | Koai | |
| 5,261,015 A | 11/1993 | Glasheen | |
| 5,612,815 A | 3/1997 | Labeye et al. | |
| 5,828,800 A * | 10/1998 | Henry et al. .................. 385/20 |
| 5,999,290 A | 12/1999 | Li ............................... 359/127 |
| 6,169,826 B1 * | 1/2001 | Nishiyama et al. ........... 385/22 |
| 6,192,171 B1 * | 2/2001 | Goodman et al. ............ 385/16 |
| 6,363,183 B1 | 3/2002 | Koh ............................. 385/19 |
| 6,385,362 B1 | 5/2002 | Norwood ..................... 385/14 |
| 6,421,477 B1 * | 7/2002 | Hane et al. ................... 385/21 |
| 6,445,841 B1 | 9/2002 | Gloeckner et al. ........... 385/17 |
| 6,487,330 B2 * | 11/2002 | Horino et al. ................ 385/16 |
| 6,574,385 B2 * | 6/2003 | Irwin .......................... 385/16 |
| 6,625,356 B2 * | 9/2003 | Ticknor et al. ............... 385/39 |
| 2001/0031113 A1 | 10/2001 | Frish et al. ................... 385/24 |
| 2002/0159677 A1 * | 10/2002 | Hsu et al. .................... 385/16 |

OTHER PUBLICATIONS

Cornel Marxer et al., "Micro-Opto-Mechanical 2 X 2 Switch for Single-Mode Fibers Based on Plasma-Etched Silicon Mirror and Electrostatic Actuation", Journal of Lightwave Technology, vol. 17, No. 1, Jan. 1999.

(Continued)

*Primary Examiner*—Akm Enayet Ullah
*Assistant Examiner*—Kevin S. Wood
(74) *Attorney, Agent, or Firm*—Oliff & Berridge, PLC

(57) ABSTRACT

A micro-optical device having an aligned waveguide switch. The device includes a stationary input part, a stationary output part and a movable part. The stationary input part and the stationary output part each have a plurality of input and output waveguides, respectively. The movable part has a plurality of switching waveguides and is movable relative to the stationary input and output parts. A stop block limits movement of the movable part in order to align at least one of the switching waveguides with the applicable input waveguide(s) and output waveguide(s). The movement of the movable part is substantially transverse.

19 Claims, 37 Drawing Sheets

OTHER PUBLICATIONS

Shi-Sheng Lee et al., "Free-Space Fiber-Optic Switches Based on MEMS Vertical Torsion Mirrors", Journal of Lightwave Technology, vol. 17, No. 1, Jan. 1999.

Hiroshi Toshiyoshi et al., "Electrostatic Micro Torsion Mirrors for an Optical Switch Matrix", Journal of Microelectromechanical Systems, vol. 5, No. 4, Dec. 1996.

Hiroshi Toshiyoshi et al., "Electromagnetic Torsion Mirrors for Self-Aligned Fiber-Optic Crossconnectors by Silicon Micromachining", IEEE Journal of Selected Topics in Quantum Electronics, vol. 5, No. 1 Jan./Feb. 1999.

L. Y. Lin et al., "Free-Space Micromachined Optical Switches for Optical Networking", IEEE Journal of Selected Topics in Quantum Electronics, vol. 5, No. 1, Jan./Feb. 1999.

A. Azzam Yasseen et al., "A Rotary Electrostatic Micromotor 1 X 8 Optical Switch", IEEE Journal of Selected Topics in Quantum Electronics, vol. 5, No. 1, Jan./Feb. 1999.

Joseph E. Ford et al., "Wavelength Add-Drop Switching Using Tilting Micromirrors", Journal of Lightwave Technology, vol. 17, No. 5, May 1999.

B. Jalali et al., "Advances in Silicon-on-Insulator Optoelectronics", IEEE Journal of Selected Topics in Quantum Electronics, vol. 4, No. 6, Nov./Dec. 1998.

M.R.T. Pearson et al., "Arrayed waveguide grating demultiplexers in silicon-on-insulator", Ontario, Canada.

E. Ollier et al., "Micro-opto mechanical switch integrated on silicon", Electronics Letters, vol. 31, No. 23, Nov. 1995.

E. Ollier et al., "Integrated electrostatic micro-switch for optical fibre networks driven by low voltage", Electronics Letters, vol. 32, No. 21, Oct. 1996.

Terry T. H. Eng et al., "Micromechanical Optical Switching with Voltage Control Using SO1 Movable Integrated Optical Waveguides", IEEE Photonics Technology Letters, vol. 7, No. 11, Nov. 1995.

"Arrayed Waveguide Grating Multiplexer/Demultiplexer", Lucent Technologies, Jan. 2000.

U.S. Appl. No. 09/467,526, filed Dec. 21, 1999, Kubby et al.
U.S. Appl. No. 09/468,423, filed Dec. 21, 1999, Kubby et al.
U.S. Appl. No. 09/468,141, filed Dec. 21, 1999, Kubby et al.
U.S. Appl. No. 09/467,185, filed Dec. 20, 1999, Kubby et al.
U.S. Appl. No. 09/467,184, filed Dec. 20, 1999, Kubby et al.
U.S. Appl. No. 09/467,482, filed Dec. 20, 1999, Kubby et al.
U.S. Appl. No. 09/718,017, filed Nov. 20, 2000, Lin.
U.S. Appl. No. 09/844,574, filed Apr. 30, 2001, Chen et al.

* cited by examiner

MONOLITHIC RECONFIGURABLE OPTICAL MULTIPLEXER SYSTEMS AND METHODS

This is a divisional of U.S. application Ser. No. 09/986,395; filed Nov. 8, 2001 U.S. Pat. No. 6,658,179 by the same inventors, and claims priority therefrom.

BACKGROUND OF THE INVENTION

1. Field of Invention

This invention relates to optical micromachined or microelectromechanical system based multiplexers and multiplexing methods.

2. Description of Related Art

Multiplexers are generally well-known. For example, an optical multiplexer/demultiplexer comprising an array of optical waveguides is described in U.S. Pat. No. 5,002,350 to Dragone. For optical applications, an optical add/drop multiplexer receives an input optical signal with many optical channels at different wavelengths from a single optical fiber. The optical signal is demultiplexed into separate optical channels based on their wavelengths. Once demultiplexed, each of the separate optical channels can either pass through the optical add/drop multiplexer to a multiplexer or be dropped. For any channel that is dropped, a new signal can be added to utilize that channel. The passed and added channels are remultiplexed into an output optical signal sent out on a single optical fiber.

Current optical add/drop multiplexers are assembled from discrete components including demultiplexers, switches and multiplexers. Typical multiplexers and demultiplexers include diffraction gratings in free space optics and arrayed waveguide gratings for guided wave optics. Optical switches are used for dropping, adding and passing channels.

SUMMARY OF THE INVENTION

The systems and methods of this invention provide high quality optical multiplexing of an optical signal with improved performance.

The systems and methods of this invention separately provide optical multiplexers with improved manufacturability and reduced manufacturing costs.

The systems and methods of this invention separately provide optical multiplexers with reduced size and weight.

The systems and methods of this invention separately provide optical multiplexers with latching switches.

The systems and methods of this invention separately provide monolithic integration of optical multiplexers and demultiplexers with optical switches.

The systems and methods of this invention separately and independently provide a micro-optical device having an aligned waveguide switch.

According to various exemplary embodiments of the systems and methods of this invention, a silicon demultiplexer, a plurality of silicon switches and a silicon multiplexer are monolithically integrated on a single silicon chip. In embodiments, the silicon demultiplexer and the silicon multiplexer each comprise a diffraction grating. In other embodiments, the silicon demultiplexer and the silicon multiplexer each comprise an arrayed waveguide grating. In various exemplary embodiments, the silicon optical switches comprise 1×2 or 2×2 or m×n optical switches, optical changeover switches, micromachined torsion mirrors, electrostatic, magnetostatic, piezoelectric or thermal micromirrors, and/or tilting micromirrors.

According to various exemplary embodiments of the systems and methods of this invention, an optical signal is input into a monolithic reconfigurable optical multiplexer. The input optical signal comprises a data stream. The optical multiplexer includes at least one silicon demultiplexer, a plurality of silicon optical switches and at least one silicon multiplexer integrated on a single silicon chip. In embodiments, an optical signal is output that comprises a modified data stream.

According to various exemplary embodiments of the systems and methods of this invention, an optical communications system comprises an input optical fiber, a silicon demultiplexer communicating with the input optical fiber, a silicon multiplexer, a plurality of silicon optical switches communicating between the silicon demultiplexer and the silicon multiplexer and an output optical fiber communicating with the silicon multiplexer. The silicon demultiplexer, optical switches and multiplexer are monolithically integrated on a single silicon chip.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF PREFERRED EMBODIMENTS

Figure 1:
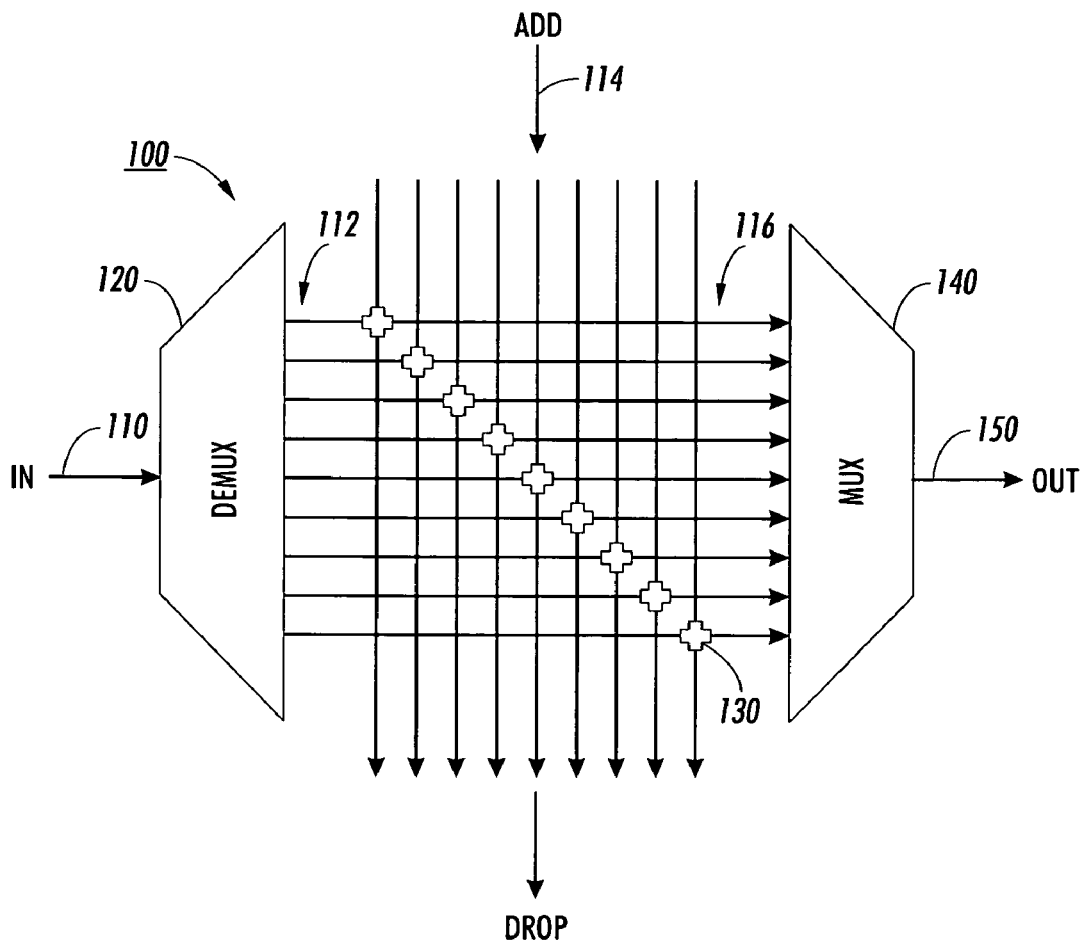
FIG. 1 is a schematic representation of a conventional reconfigurable optical add/drop multiplexer.

While the invention is described hereafter with reference to an add/drop multiplexer, it should be understood that this invention is not strictly limited to adding and/or dropping signals. Rather, any device that allows modification of a signal via multiplexing after demultiplexing is contemplated by this invention.

The systems and methods of this invention provide monolithic integration of optical multiplexers and demultiplexers with optical switches on a silicon chip for use as a reconfigurable optical multiplexer. Thus, a reconfigurable optical multiplexer according to various embodiments of this invention comprises a silicon demultiplexer, a plurality of silicon switches and a silicon multiplexer monolithically integrated on a single silicon chip. The monolithic integration of this invention can improve the manufacturability of reconfigurable optical multiplexers, leading to reduced costs. Also, the monolithic integration of this invention provides a relatively compact optical multiplexer of significantly reduced size and weight. Further, reconfigurable optical multiplexers according to this invention can provide higher quality optical multiplexing of an optical signal with improved performance.

In various exemplary embodiments, the silicon demultiplexer and the silicon multiplexer each comprise a diffraction grating. In other exemplary embodiments, the silicon demultiplexer and the silicon multiplexer each comprise an arrayed waveguide grating. The silicon optical switches may comprise 1×2 or 2×2 or, in general, m×n optical switches, optical changeover switches, micromachined torsion mirrors, electrostatic, magnetostatic, piezoelectric or thermal micromirrors, and/or tilting micromirrors.

According to various exemplary embodiments, an optical signal is input into a monolithic reconfigurable optical multiplexer of this invention. The input optical signal may comprise a wavelength division multiplexed (WDM) data stream. The input optical signal is demultiplexed into separate channels according to wavelengths of light in the signal using the demultiplexer. Each channel is either passed through or dropped out using the optical switches. For each channel that is dropped out, a new data stream at the same wavelength may be added to utilize that channel. The channels are then multiplexed back together as an output optical signal using the multiplexer. The output optical signal may comprise a modified data stream, depending on the dropping/adding, or other modification, of channels.

A monolithic reconfigurable optical multiplexer according to this invention may be incorporated into an optical communications system. An input optical fiber carrying a multiplexed optical signal may communicate with the demultiplexer and an output optical fiber may communicate with the multiplexer. The plurality of optical switches then communicate between the demultiplexer and the multiplexer to pass and/or modify the optical signal. For example, the monolithic reconfigurable optical multiplexer according to this invention may be incorporated into a document device, such as a printer, a copier, a scanner, a facsimile machine, a multi-function device or the like. Further, the monolithic reconfigurable optical multiplexer according to this invention may be incorporated into a distributed communication network. Thus, any system or device that includes a distributed communication network is contemplated by this invention.

According to various exemplary embodiments of this invention, micromachining and other microelectromechanical system based manufacturing techniques are used to fabricate a monolithic reconfigurable optical multiplexer. Such manufacturing technologies are relatively advanced compared to other potential technologies, yielding more reliable results and greater flexibility.

In various exemplary embodiments, surface micromachining techniques are used to fabricate a monolithic reconfigurable optical multiplexer from a silicon on insulator (SOI) wafer as a starting substrate. In other exemplary embodiments, surface micromachining techniques are used to fabricate a monolithic reconfigureable optical multiplexer from a first wafer with a patterned semiconductor layer on at least one side and a second wafer of single crystal silicon bonded to the semiconductor layer on the first wafer. The second wafer may also have a patterned semiconductor layer on the side that is bonded to the semiconductor layer on the first wafer.

A schematic representation of a conventional reconfigurable optical add/drop multiplexer 100 is shown in FIG. 1. The optical add/drop multiplexer 100 receives an input optical signal 110 with many optical channels at different wavelengths from a single optical fiber. The input optical signal 110 is demultiplexed by a demultiplexer 120 into separate optical channels 112 based on the wavelengths of the optical channels 112. Once demultiplexed, each of the separate optical channels 112 encounters one of a plurality of optical switches 130. The optical switches 130 can either pass or drop out the respective one of the optical channels 112. For any of the optical channels 112 that are dropped, a new signal 114 can be added by the optical switches 130 to utilize that channel. Channels 116 that are passed or added by the optical switches 130 are remultiplexed by a multiplexer 140 into an output optical signal 150 and output to a single optical fiber. Because channels may be dropped and added, the output optical signal 150 may comprise a modified data stream as compared to the input optical signal 110.

Figure 2:
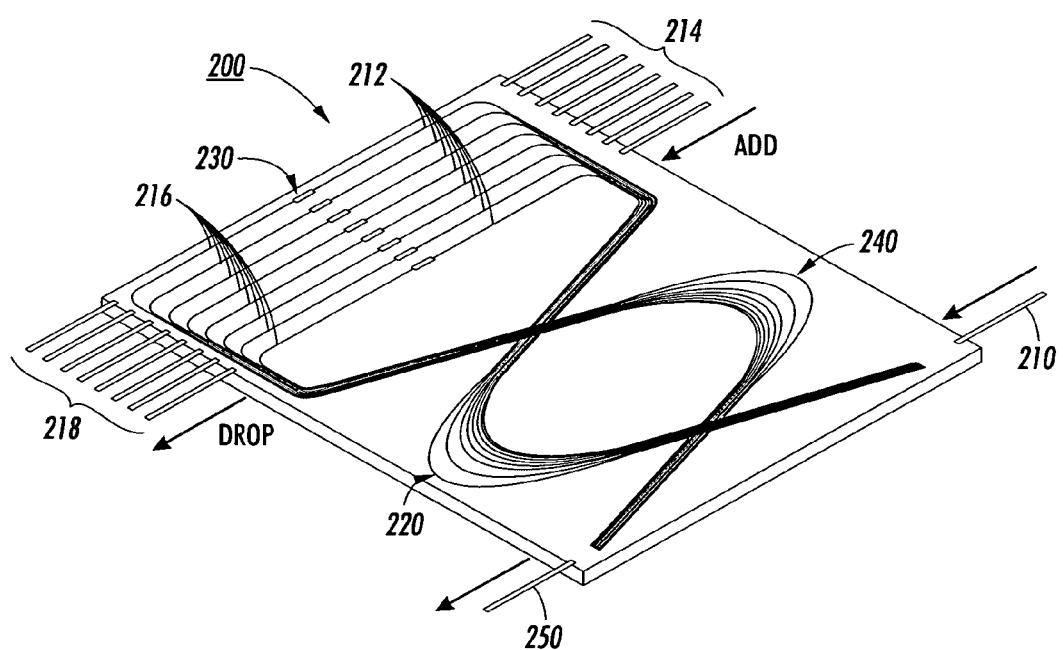
FIG. 2 is schematic representation of an exemplary embodiment of a reconfigurable optical multiplexer according to this invention.

A schematic representation of a reconfigurable optical add/drop multiplexer 200 according to this invention is shown in FIG. 2. As with the conventional add/drop multiplexer 100, the optical add/drop multiplexer 200 receives an input optical signal with many optical channels at different wavelengths from an input optical fiber 210. The signal from the input optical fiber 210 is demultiplexed by a silicon demultiplexer 220 into separate optical channels 212 based on the wavelengths of the optical channels 212. As shown in FIG. 2, the silicon demultiplexer 220 is an arrayed waveguide grating.

Once demultiplexed, each of the separate optical channels 212 of the signal encounters one of a plurality of silicon optical switches 230. The silicon optical switches 230 can either pass or drop out the respective one of the optical channels 212 as a dropped signal 218. For any of the optical channels 212 that are dopped, one or new signals 214 can be added by the silicon optical switches 230 to utilize that channel. Channels 216 that are passed or added by the silicon optical switches 230 are remultiplexed by a silicon multiplexer 240 into an output optical signal that is output via an output optical fiber 250. Because channels may be dropped and added, the signal from the output optical fiber 250 may comprise a modified data stream as compared to the signal from the input optical fiber 210.

Figure 3:
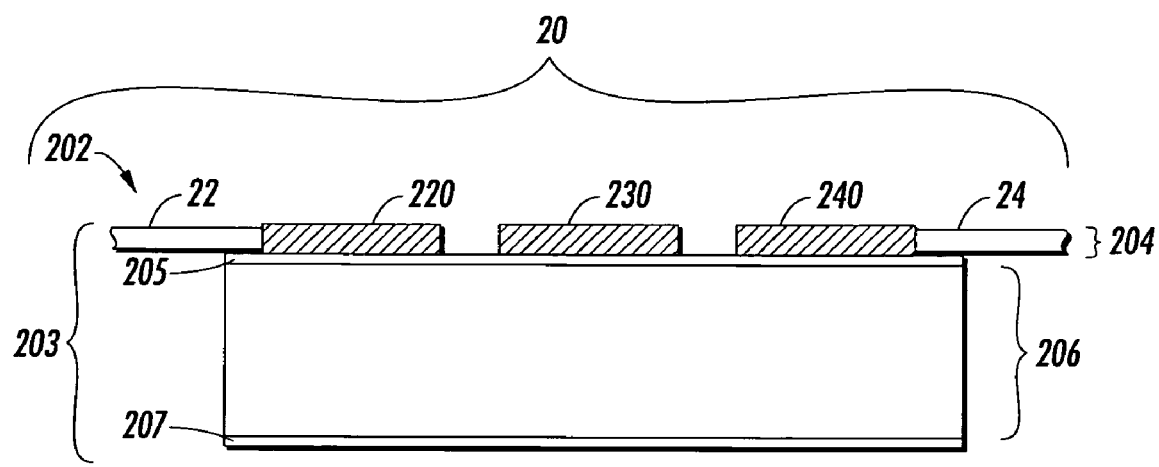
FIG. 3 is a cross-sectional view of the exemplary embodiment of FIG. 2 as incorporated into an optical communications system.

As shown in FIG. 3, the reconfigurable optical add/drop multiplexer 200 is formed by the silicon demultiplexer 220, the silicon optical switches 230 and the silicon multiplexer 240 monolithically integrated on a single silicon chip 202. The single silicon chip 202 may comprise a silicon on insulator (SOI) wafer 203 including a relatively thin single crystal silicon device layer 204 and an oxide layer 205. A relatively thick single crystal silicon handle layer 206 may be integrally bonded to the device layer 204 by the oxide layer 205 for structural support. Further, an auxiliary oxide or nitride layer 207 may be formed on an opposite side of the handling layer 206 for etching techniques. The wafer 203 may be fabricated using any known or later developed silicon on insulator (SOI) techniques.

In the exemplary embodiment, the silicon demultiplexer 220, the silicon optical switches 230 and the silicon multiplexer 240 are fabricated in the device layer 204. One or more polysilicon layers (not shown) may be added over the device layer 204 for fabrication of additional mechanical elements, such as hinges, bridges, guides, anchors and the like, or electrical elements, such as heaters, actuators or wires. Active electronic elements (not shown), such as electrical traces or logic circuitry, may also be defined in the device layer 204.

Figure 4:
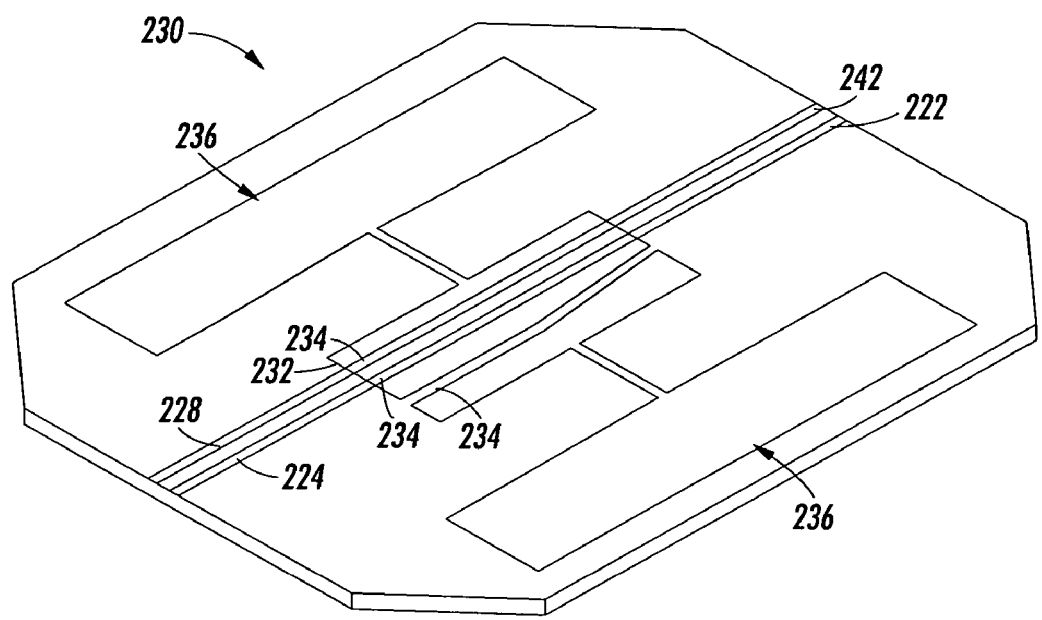
FIG. 4 is an exemplary embodiment of a switch for a reconfigurable optical multiplexer according to this invention.

An exemplary embodiment of one of the silicon optical switches 230 is shown in FIG. 4 as a waveguide switch or optical changeover switch. The switch 230 has a movable part 232 with a plurality of waveguides 234. An input waveguide 222 corresponding to one of the channels 212 from the silicon demultiplexer 220 (shown in FIG. 2) and a waveguide 242 for carrying the new signal 214 to be added are situated at one end of the waveguides 234. Similarly, an output waveguide 224 corresponding to one of the channels 216 to the silicon multiplexer 240 (shown in FIG. 2) and a waveguide 228 for dropping a signal are situated at the other end of the waveguide 234.

As indicated by the arrows in FIG. 4, the movable part 232 is moved transversely by a pair of actuators 236. The actuators 236 may be of any suitable type, such as, for example, thermal, electrostatic or magnetic.

The waveguides 234 are configured so that the transverse movement of the movable part 232 will switch between one of the waveguides 234 connecting the input waveguide 222 to the output waveguide 224 and one of the waveguides 234 connecting the waveguide 242 carrying the new signal 214 to the output waveguide 224. To drop the signal of the input waveguide 222, one of the waveguides 234 can connect the input waveguide 222 to the waveguide 228.

A suitable technique for fabricating the silicon demultiplexer 220, the silicon optical switches 230 and the silicon multiplexer 240 in the device layer 204 is described in copending U.S. patent application Ser. No. 09/467,526 and U.S. Pat. Nos. 6,362,512 and 6,379,989, which are incorporated by reference in their entirety. Another suitable technique is described in copending U.S. patent application Ser. No. 09/718,017, which is incorporated by reference in its entirety.

The silicon demultiplexer 220 and the silicon multiplexer 240 may be any known or later developed multiplexer that is capable of fabrication in silicon. In particular, the silicon demultiplexer 220 and the silicon multiplexer 240 may be diffraction gratings for free-space optics. Free-space optics may be preferred in applications where optical losses are to be minimized. Such diffraction gratings may be fabricated using the techniques described in copending U.S. patent application Ser. No. 09/467,184 and U.S. Pat. Nos. 6,249,346 and 6,399,405, which are incorporated by reference in their entirety.

When the silicon demultiplexer 220 and the silicon multiplexer 240 are diffraction gratings, any free-space optical switch capable of add/drop functionality and of fabrication in silicon may be used for the silicon optical switches 230. Examples of known free-space optical switches include those described in "Micro-Opto-Mechanical 2×2 Switch for Single-Mode Fibers Based on Plasma-Etched Silicon Mirror and Electrostatic Actuation", Cornel Marver et al., Journal of Lightwave Technology, Vol. 17, No. 1, pp. 2–6 (1999); "Free-Space Fiber Optic Switches Based on MEMS Vertical Torsional mirrors", Shi-Sheng Lee et al., Journal of Lightwave Technology, Vol. 17, No. 1, pp. 7–13 (1999); "Electrostatic Micro Torsion Mirrors for an Optical Switch Matrix", Hiroshi Toshiyoshi et al., Journal of Microelectromechanical Systems, Vol. 5, No. 4, pp. 231–237 (1996); "Electromagnetic Torsion Mirrors for Self-Aligned Fiber-Optic Cross-Connectors by Silicon Micromachining", Hiroshi Toshiyoshi et al., IEEE Journal of Selected Topics in Quantum Electronics, Vol. 3, No. 1, pp. 10–17 (1999); "Free Space Micromachined Optical Switches for Optical Networking", L. Y. Lin et al., IEEE Journal of Selected Topics in Quantum Electronics, Vol. 3, No. 1, pp. 4–9 (1999); "A Rotary Electrostatic Micromirror 1×8 Optical Switch", A. Azzam Yasseen et al., EEE Journal of Selected Topics in Quantum Electronics, Vol. 3, No. 1, pp. 26–32 (1999); and "Wavelength Add-Drop Switching Using Tilting Micromirrors", Joseph E. Ford et al., Journal of Lightwave Technology, Vol. 17, No. 5, pp. 904–911 (1999), which are incorporated by reference in their entirety. Thus, the silicon optical switches 230 may be, for example, 1×2, 2×2 or m×n optical switches, micromachined torsion mirrors, electrostatic or magnetostatic micromirrors, and/or tilting micromirrors and the like. For certain applications, such as telecommunications, the silicon optical switches 230 should be latching switches that retain their state when power is lost.

Alternatively, the silicon demultiplexer 220 and the silicon multiplexer 240 may be arrayed waveguide gratings for guided wave optics. Guided wave optics allow simplified manufacture and avoid out-of-plane assembly that may be required for free-space optical components. Thus, guided wave optics may be preferred in applications where optical losses are not a critical factor. Such arrayed waveguide gratings may be fabricated using any known or later developed techniques, such as those described in "Advances in Silicon-on-Insulator Optoelectronics", B. Jalali et al., IEEE Journal of Selected Topics in Quantum Electronics, Vol. 4, No. 6, pp. 938–947 (1998), and "Arrayed waveguide grating demultiplexers in silicon-on-insulator", M. R. T. Pearson et al., Proceedings of SPIE Silicon-Based Monothic and Hybrid Optoelectronic Devices, Photonics West Meeting, San Jose Calif., January 2000, which are incorporated by reference in their entirety.

When the silicon demultiplexer 220 and the silicon multiplexer 240 are arrayed waveguide gratings, any waveguide switch capabie of add/drop functionality of fabrication in silicon may be used for the silicon optical switches 230. Examples of known waveguide switches include those described in "Micro-opto mechanical switch integrated on silicon", E. Ollier et al., Electronics Letters, Vol. 31, No. 23, pp. 2003–2005 (1995); "Integrated electrostatic microswitch for optical fibre networks driven by low voltage", E. Ollier et al., Electronics Letters, Vol. 32, No. 21, pp. 2007–2009 (1996); "Micromechanical Optical Switching With Voltage Control Using SOI Moveable Integrated Optical Waveguides", Terry T. H. Eng et al., IEEE Photonics Technology Letters, Vol. 7, No. 11, pp. 1297–1299 (1995); and U.S. Pat. No. 5,002,354 to Koai, U.S. Pat. No. 5,261,015 to Glasheen and U.S. Pat. No. 5,612,815 to Labeye et al., which are incorporated by reference in their entirety. Thus, the silicon optical switches 230 may be, for example, micro-opto mechanical switches, electrostatic or magnetostatic micro-switches, and/or integrated optical changeover switches and the like.

As noted above, the monolithic reconfigurable optical add/drop multiplexer 200 according to this invention may be incorporated into an optical communications system 20. As shown in FIG. 3, an input optical fiber 22 carrying an optical signal is placed in communication with the silicon demultiplexer 220 and an output optical fiber 24 is placed in communication with the silicon multiplexer 240. The plurality of silicon optical switches pass and/or modify the optical signal from the silicon demultiplexer 220, as described above, and send the optical signal to the silicon multiplexer 240. Once remultiplexed, the optical signal, having been modified as desired, is passed to the output optical fiber 24.

When the optical add/drop multiplexer 200 according to this invention is incorporated into the optical communications system 20, the input optical fiber 22 and the output optical fiber 24 need to be aligned with the silicon demultiplexer 220 and the silicon multiplexer 240, respectively. This alignment may be accomplished by any known or later developed technique. For example, for free-space optics, the optical fibers 22 and 24 may be aligned using a technique described in copending U.S. Pat. No. 6,580,858, which is incorporated by reference in its entirety.

FIGS. 5–10 show a first exemplary embodiment of a self-aligned waveguide switch 330 for optical fiber communication that may be used in the optical add/drop multiplexer of this invention. For various embodiments, the tolerance of misalignment between waveguides of the switch 330 is less than 0.5 microns to avoid unacceptable optical loss. The switch 330 is self-aligned to implement a high precision optical system.

Figure 5:
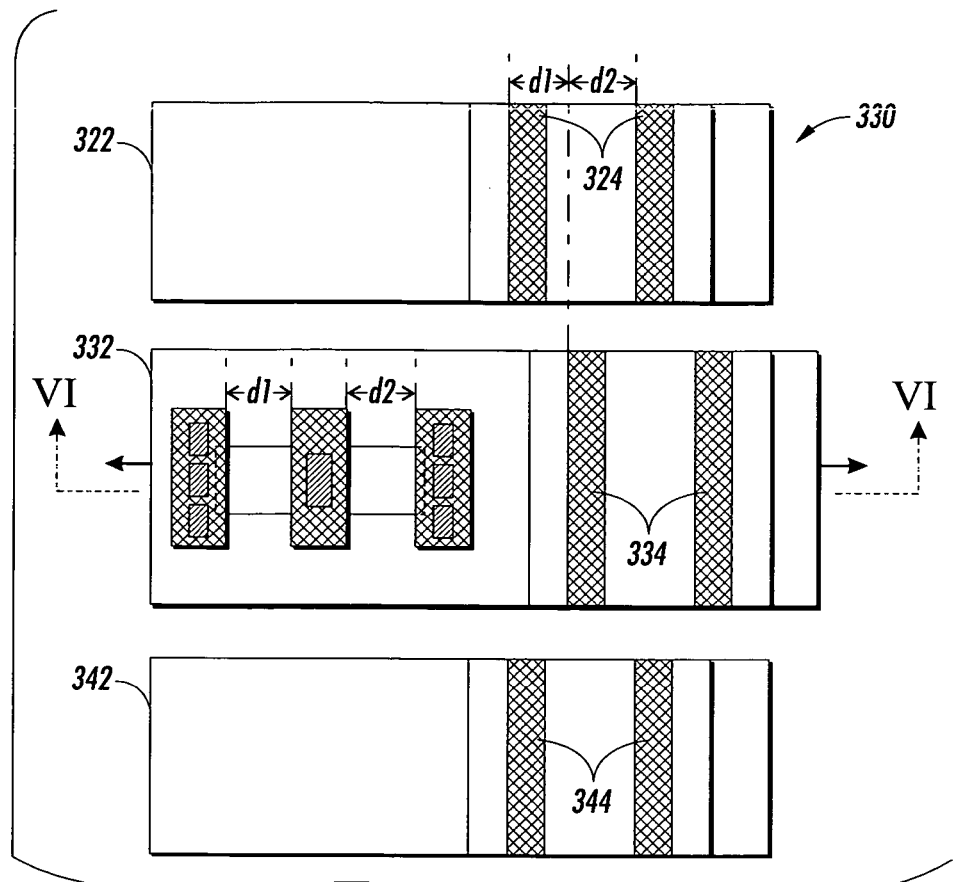
FIGS. 5–10 show a first exemplary embodiment of a self-aligned waveguide switch according to this invention.

As shown in FIG. 5, the switch 330 includes a movable part 332 with a plurality of waveguides 334. A stationary input part 322 of the switch 330 is in optical communication with, for example, the demultiplexer of the optical add/drop multiplexer and has a plurality of waveguides 324. A stationary output part 342 is in optical communication with, for example, the multiplexer of the optical add/drop multiplexer and has a plurality of waveguides 344.

Figure 6:
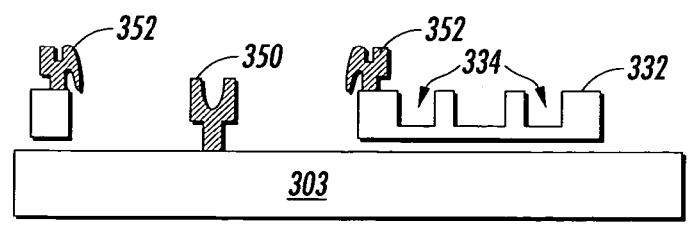

As shown in FIG. 6, a stop block 350 is anchored to a substrate 303 of, for example, the optical add/drop multiplexer. The stop block 350 is used to control the position of the movable part 332 of the switch 330 by limiting the movement of the movable part 332. A set of offsets d1 and d2 is defined between the waveguides 334 of the movable part 332 and the waveguides 324 and 344 of the stationary parts 322 and 342. As described further below, the set of offsets d1 and d2 is defined by photolithography before the movable part 332 is released from the substrate 303.

Also, one or more bumpers 352 may be constructed on the movable part 332 of the switch 330. The same offsets d1 and d2 are used to locate the bumpers 352 such that the distance from the stop block 350 to an inside edge of one bumper 352 is d1 and the distance from the stop block 350 to an inside edge of the other bumper 352 is d2.

Figure 7:
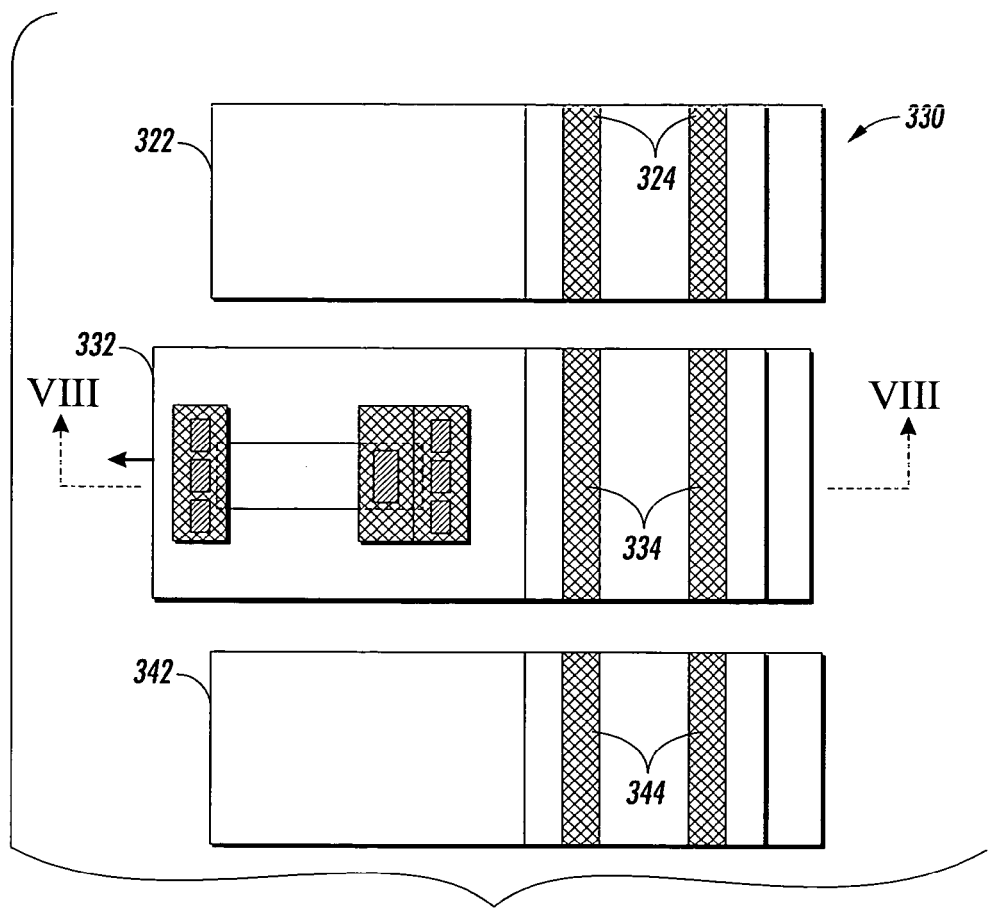
Figure 8:
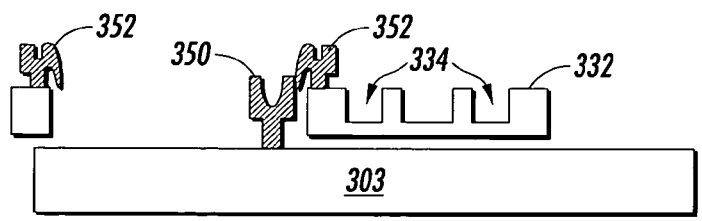
Figure 9:
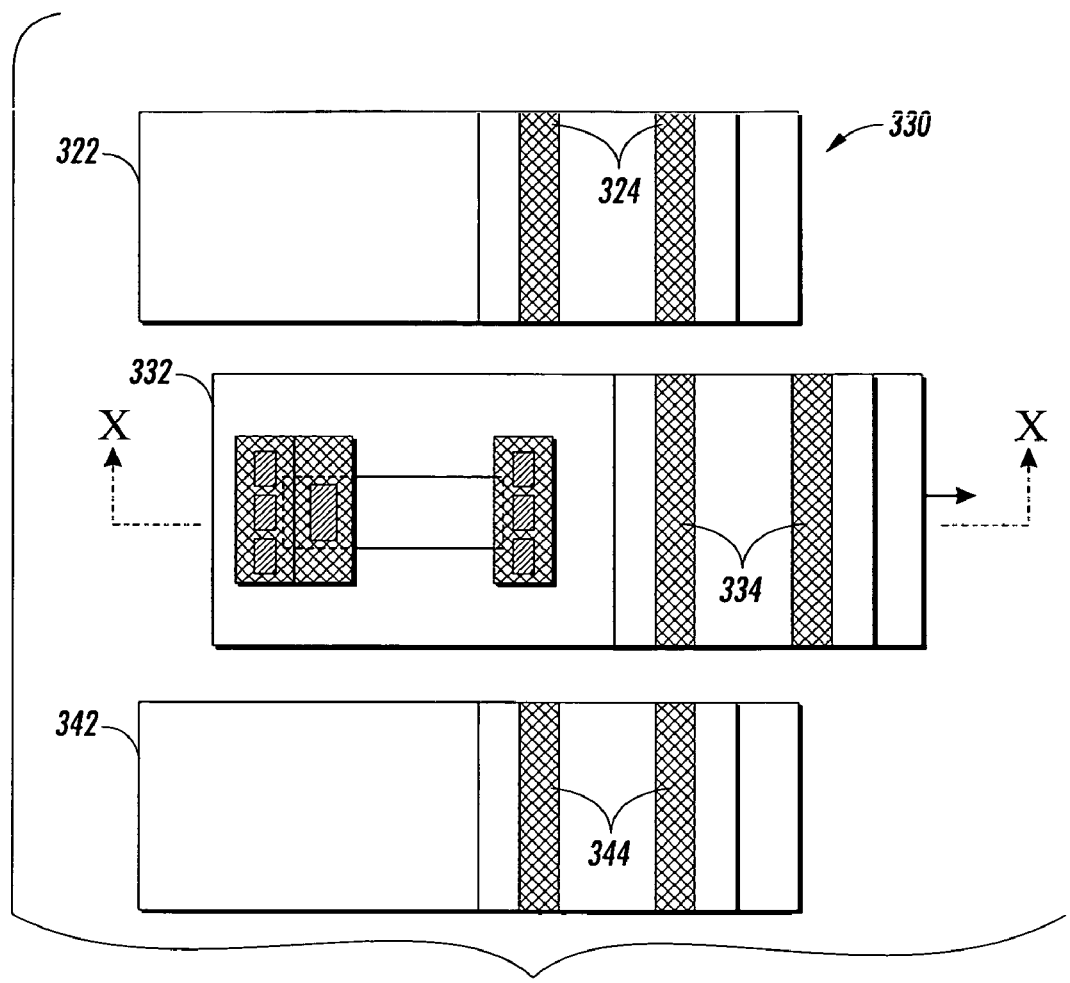
Figure 10:
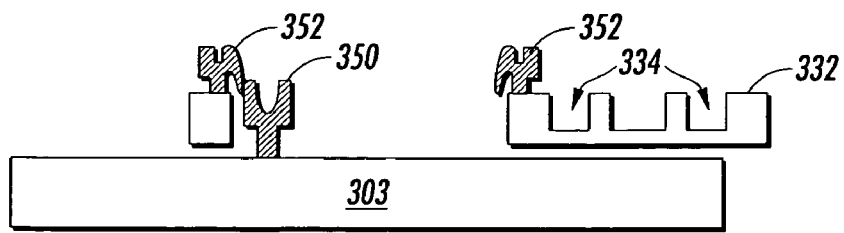

This arrangement provides two stable positions for the movable part 332 of the switch 330. As shown in FIGS. 7 and 8, the movable part 332 moves to the left in direction of the arrow A until the stop block 350 contacts one of the bumpers 352. In this position, the left waveguide 334 of the movable part 332 is aligned with the left waveguides 324 and 344 of the stationary parts 322 and 342. As shown in FIGS. 9 and 10, the movable part 332 moves to the right in direction of the arrow B until the stop block 350 contacts the other one of the bumpers 352. In this waveguides 324 and 344 of the stationary parts 322 and 342.

Figure 11:
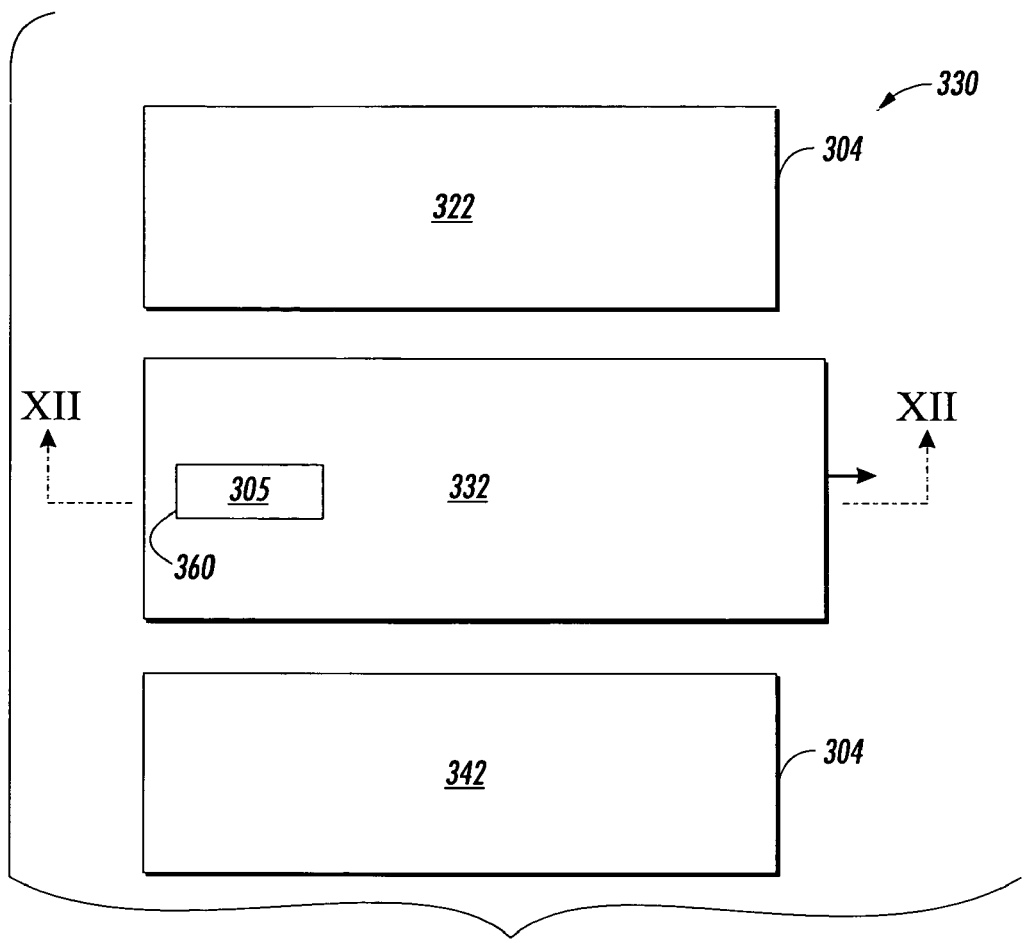
FIGS. 11–18 illustrate various stages of a first exemplary embodiment of a fabrication process for a self-aligned waveguide switch according to this invention.
Figure 12:
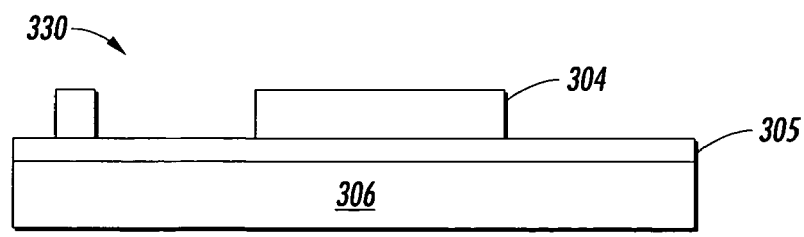

An exemplary embodiment of a micromachining fabrication process for the self-aligned switch 330 is described with reference to FIGS. 11–18. As shown in FIG. 12, the process begins with a silicon-on-insulator structure comprising a silicon substrate 306, a single-crystal-silicon layer 304 and an insulator layer 305, such as an oxide layer, therebetween. The single-crystal-silicon layer 304 is etched, for example using a dry etch, to define the movable part 332 and the stationary parts 322 and 342 of the switch 330 as shown in FIGS. 11 and 12. Further, a through hole 360 is defined in the single-crystal-silicon layer 304 to accommodate the stop block 350 shown in FIG. 16.

Figure 13:
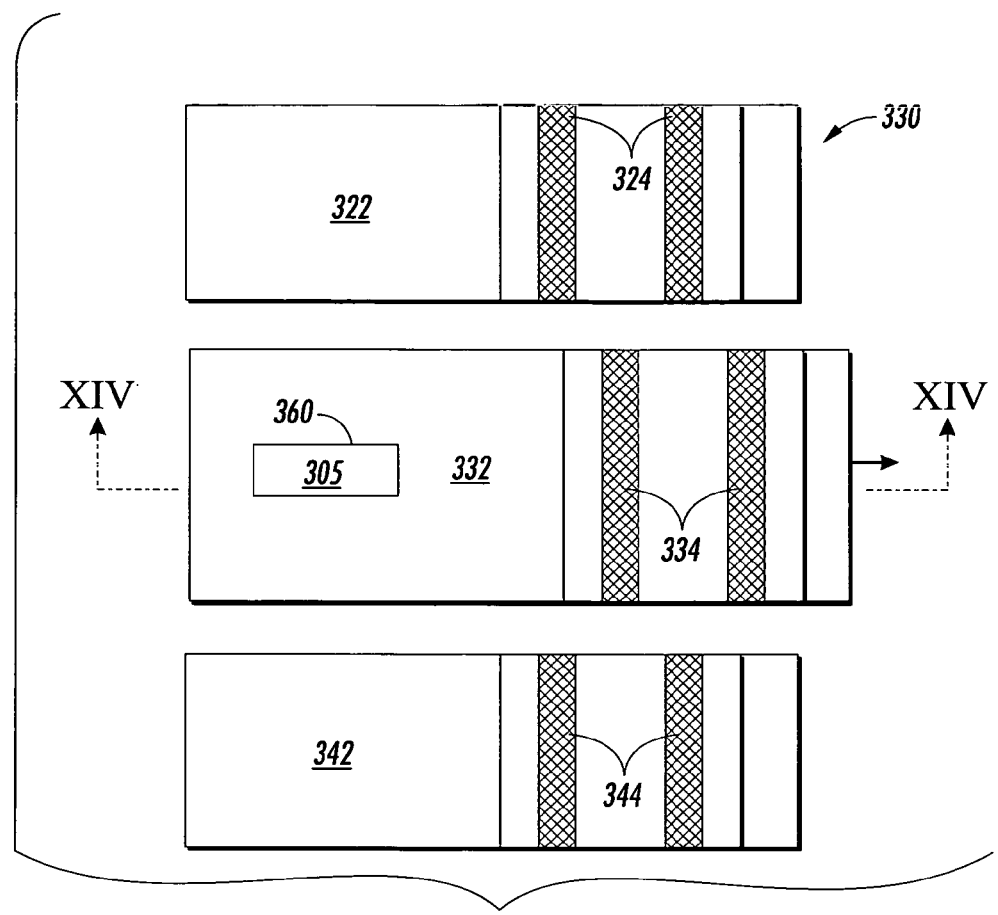
Figure 14:
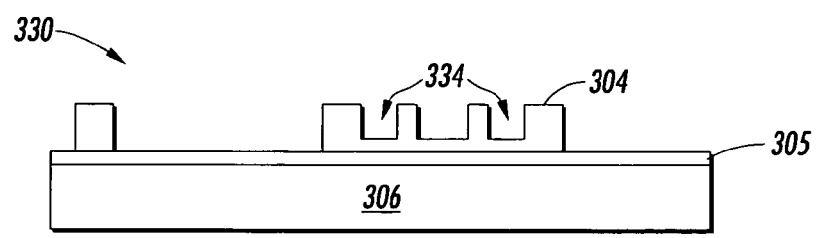
Figure 15:
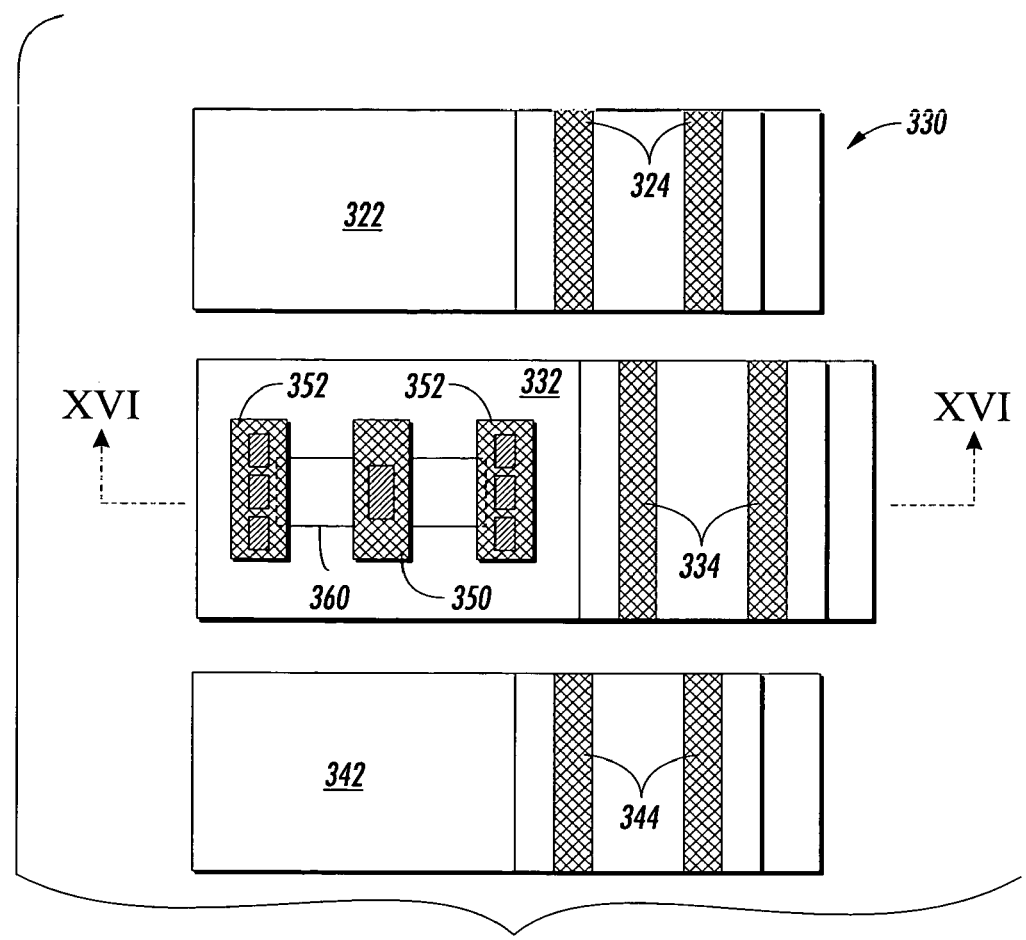
Figure 16:
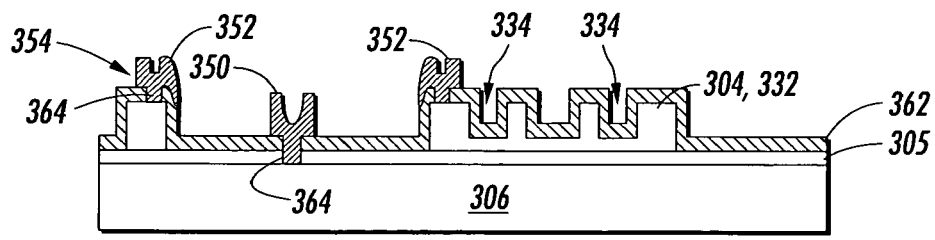

Next, as shown in FIGS. 13 and 14, the single-crystal-silicon layer 304 is etched, for example using a dry etch, to form the plurality of waveguides 334, 324 and 344 in the movable part 332 and the stationary parts 322 and 342, respectively. Then, as shown in FIGS. 15 and 16, a sacrificial layer of material 362, such as an oxide, is deposited and patterned to form one or more anchor holes 364 in the silicon substrate 306 and/or the single-crystal-silicon layer 304. As shown in FIGS. 15 and 16, the anchor hole 364 formed in the silicon substrate is for the stop block 350 and the anchor holes 364 formed in the single-crystal-silicon layer 304 are for the bumpers 352, when included. The stop block 350 and the bumpers 352 are formed by depositing a layer of structural material 354, for example polysilicon, and patterning the layer of structural material 354.

Figure 17:
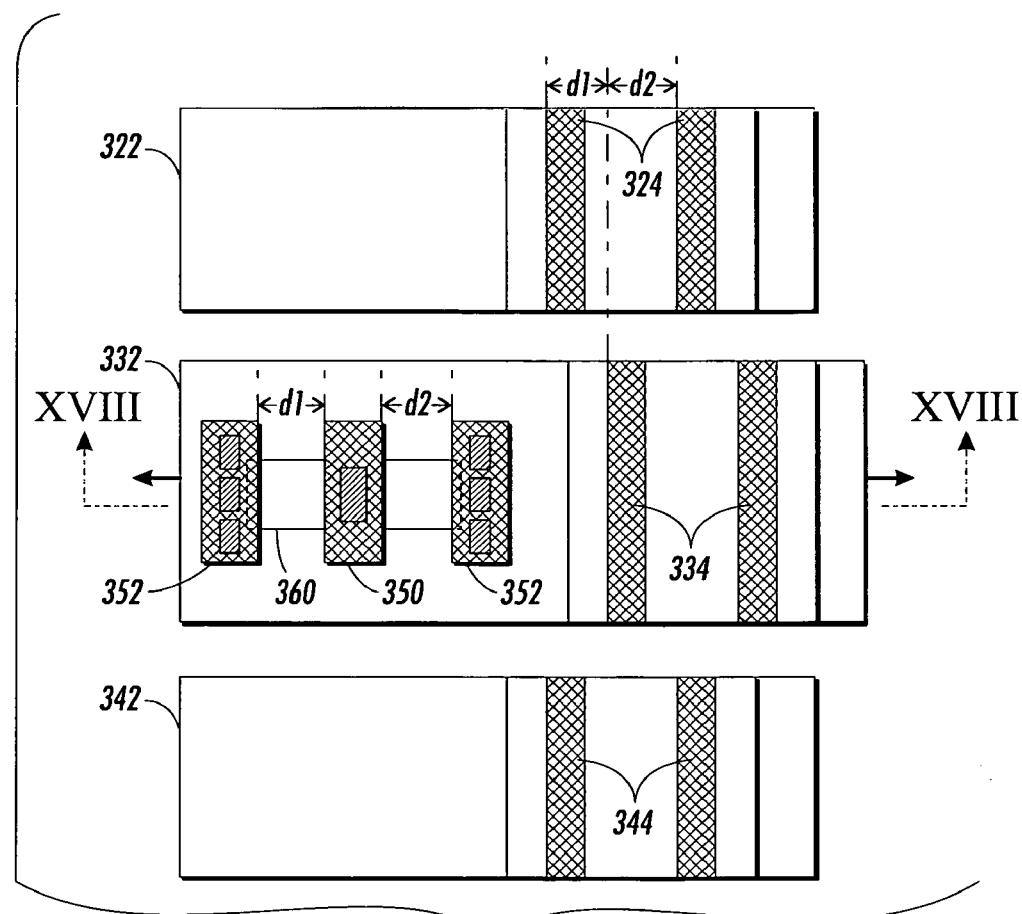
Figure 18:
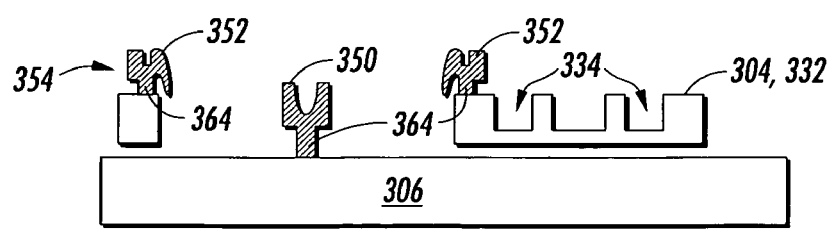

The sacrificial layer 362 and at least part of the insulator layer 305 are removed by a release etch, such as a wet etch, to obtain the switch 330 shown in FIGS. 17 and 18.

Figure 19:
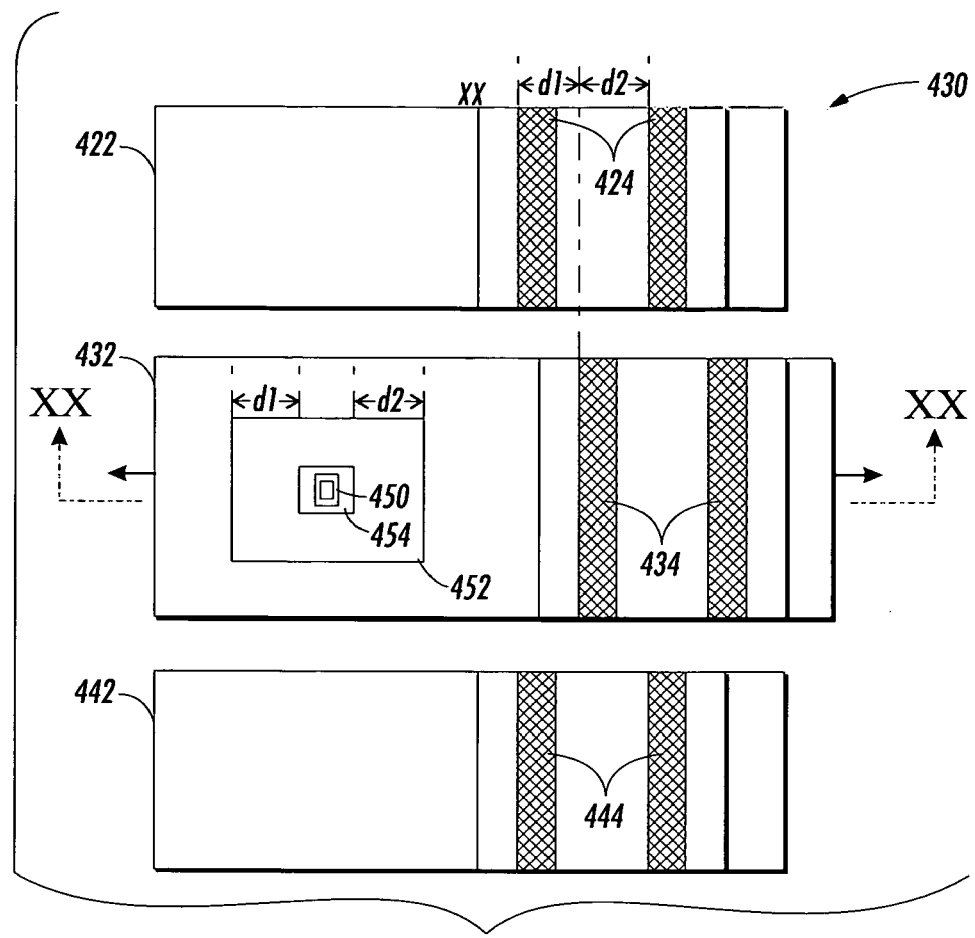
FIGS. 19–24 illustrate various stages of a second exemplary embodiment of a fabrication process for a self-aligned waveguide switch according to this invention.
Figure 20:
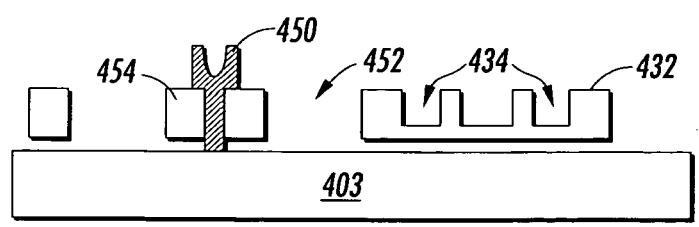

FIGS. 19–24 show a second exemplary embodiment of a self-aligned waveguide switch 430 for optical fiber communication that may be used in the optical add/drop multiplexer of this invention. As shown in FIG. 19, the switch 430 includes a movable part 432 with a plurality of waveguides 434. A stationary input part 422 of the switch 430 is in optical communication with, for example, the demultiplexer of the optical add/drop multiplexer and has a plurality of waveguides 424. A stationary output part 442 is in optical communication with, for example, the multiplexer of the optical add/drop multiplexer and has a plurality of waveguides 444. As shown in FIG. 20, a stop block 450 is anchored to a substrate 403 of, for example, the optical add/drop multiplexer. According to this embodiment, a cutout section or window 452 is formed in the movable part 432. The window 452 may be formed such that a section 454 of the layer used to fabricate the movable part 432 is connected to the stop block 450, as shown in FIG. 20.

As above, a set of offsets d1 and d2 is defined between the waveguides 434 of the movable part 432 and the waveguides 424 and 444 of the stationary parts 422 and 442. As described further below, the set of offsets d1 and d2 is defined by photolithography before the movable part 432 is released from the substrate 403. The stop block 450 and window 452 are used to control the position of the movable part 432 of the switch 430 by limiting the movement of the movable part 432. The same offsets d1 and d2 are used to define the edges of the window 452 and/or section 454 such that the distance from the stop block 450 or section 454 to one inside edge of the window 452 is d1 and the distance from the stop block 350 or section 454 to one inside edge of the window 452 is d2.

Figure 21:
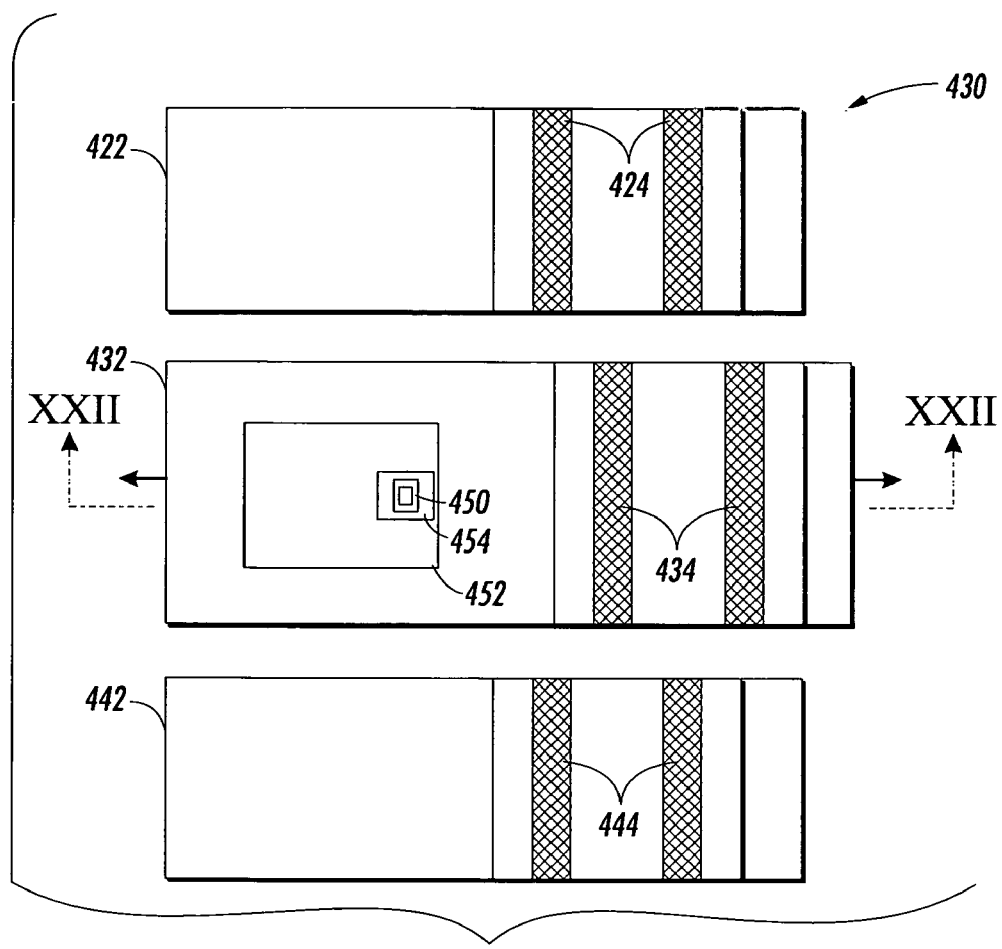
Figure 22:
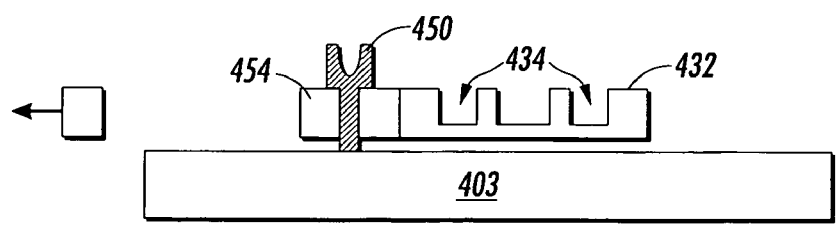
Figure 23:
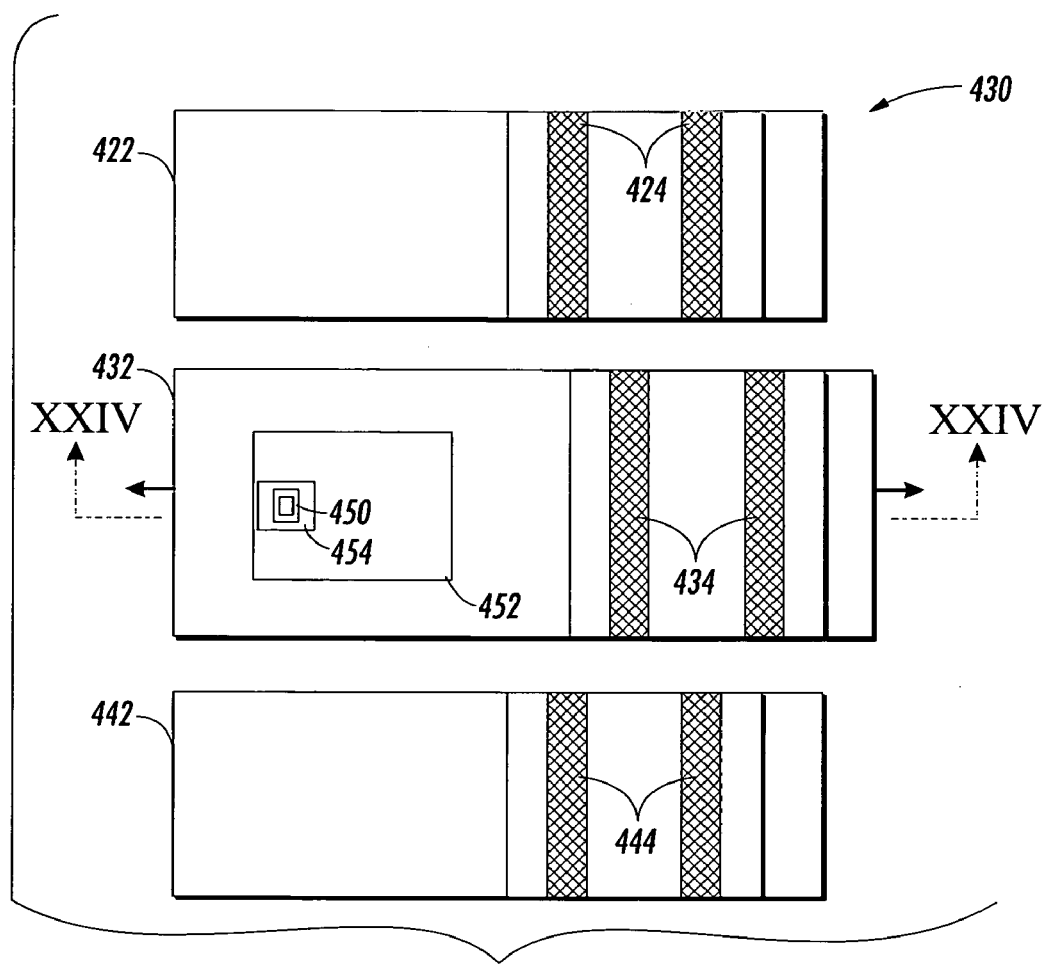
Figure 24:
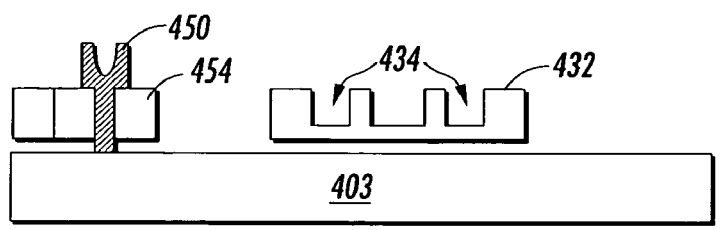

This arrangement provides two stable positions for the movable part 432 of the switch 430. As shown in FIGS. 21 and 22, the movable part 432 moves to the left in direction of the arrow A until the stop block 450 or section 454 contacts one inside edge of the window 452. In this position, the left waveguide 434 of the movable part 432 is aligned with the left waveguides 424 and 444 of the stationary parts 422 and 442. As shown in FIGS. 23 and 24, the movable part 432 moves to the right in direction of the arrow B until the stop block 450 or section 454 contacts the other inside edge of the window 452. In this position, the left waveguide 434 of the movable part 432 is aligned with the right waveguides 424 and 444 of the stationary parts 422 and 442.

Figure 25:
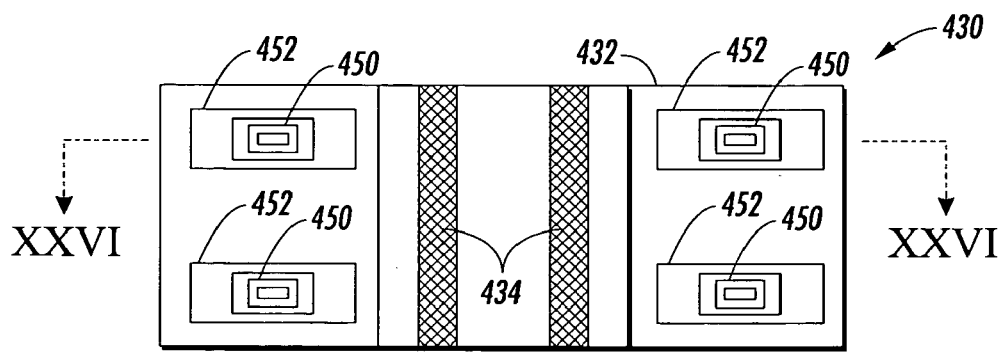
FIGS. 25–26 illustrate a modification of the second exemplary embodiment of FIGS. 19–24 according to this invention.
Figure 26:
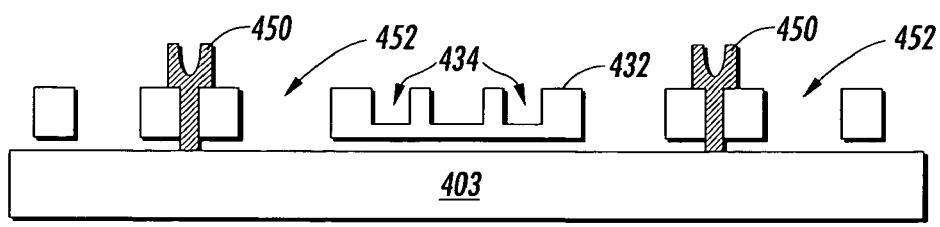

FIGS. 25–26 show a modification of the second exemplary embodiment of the self-aligned waveguide switch 430. This modification utilizes four sets of stop blocks 450 and windows 452 which may provide more stability and reliability for the switch 430.

According to this invention, the set of offsets d1 and d2 is defined in a lithographic process on one masking layer so that the set may be very accurately controlled. In other words, the structures that align the waveguides of the switch are determined by the geometrical dimensions d1 and d2 in the same structural layer. The avoids the disadvantages of alignment between different structural layers. A more detailed description of a unique silicon-on-insulator based micromachining process according to this invention is described with reference to FIGS. 27–57. The process is described below in conjunction with the fabrication of a micro-mechanical actuator for moving the switch and a V-groove for optical fiber connection. However, the actuator and/or the connection may or may not be fabricated with the switch. Thus, it should be understood that the design and configuration of the actuator and/or the connection of the optical fiber are illustrative and not limiting. The V-groove fabrication and alignment of optical fibers with the add/drop multiplexer of this invention is described in more detail in copending U.S. Pat. No. 6,510,275, filed herewith and incorporated by reference in its entirety.

In general, polysilicon surface micromachining uses planar fabrication process steps common to the integrated circuit (IC) fabrication industry to manufacture microelectromechanical or micromechanical devices. The standard building-block process consists of depositing and photolithographically patterning alternating layers on a substrate. The alternating layers consist of low-stress polycrystalline silicon (also termed polysilicon) and a sacrificial material such as silicon dioxide on a substrate. Vias etched through the sacrificial layers provide anchor points to the substrate and between the polysilicon layers. The polysilicon layers are patterned to form mechanical elements of the micromachined device. The mechanical elements are thus formed layer-by-layer in a series of deposition and patterning process steps. The silicon dioxide layers are then removed by exposure to a selective etchant, such as hydrofluoric acid (HF), which does not attack the polysilicon layers. This releases the mechanical elements formed in the polysilicon layers for movement thereof.

Figure 27:
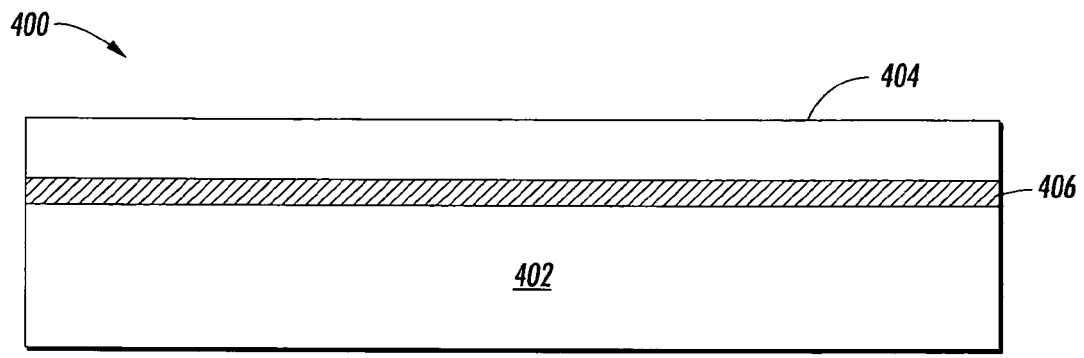
FIGS. 27–57 illustrate a more detailed exemplary embodiment of a fabrication process for a self-aligned waveguide switch according to this invention.

As shown in FIG. 27, the exemplary embodiment begins with a silicon-on-insulator wafer 400 comprising a silicon substrate 402, a single-crystal-silicon layer 404 and an insulator layer 406, such as an oxide layer, therebetween.

Figure 28:
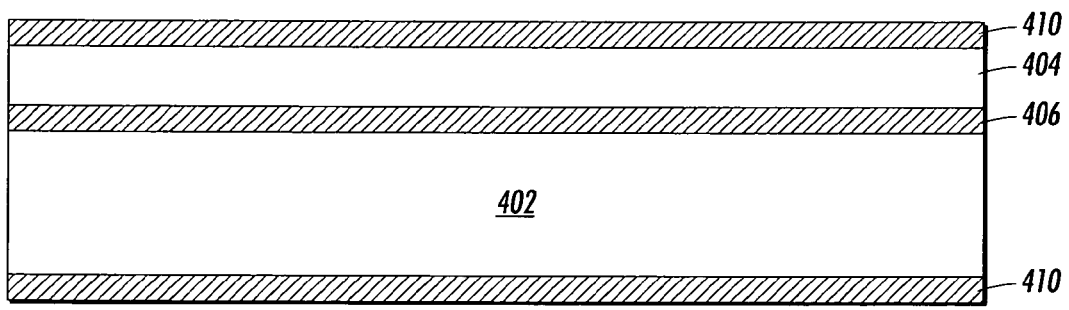
Figure 29:
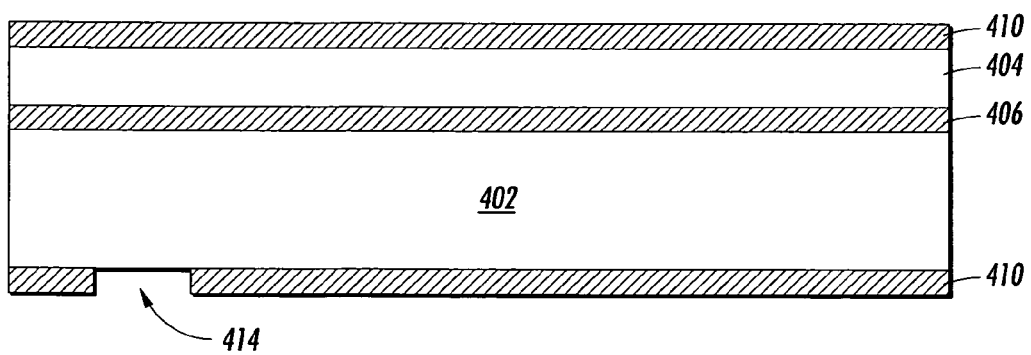

As shown in FIG. 28, a first mask layer 410, such as an oxide, is deposited, for example by low pressure chemical vapor deposition (LPCVD), onto the single-crystal-silicon layer 404 and onto the silicon substrate 402. The first mask layer 410 may be, for example, approximately 1.0 micron thick. The first mask layer 410 serves as a masking layer for protecting the single-crystal-silicon layer 404 during a subsequent etch of the silicon substrate 402. As shown in FIG. 29, a hole 414 is patterned in the first mask layer 410 to define an opening for the subsequent etch.

Figure 30:
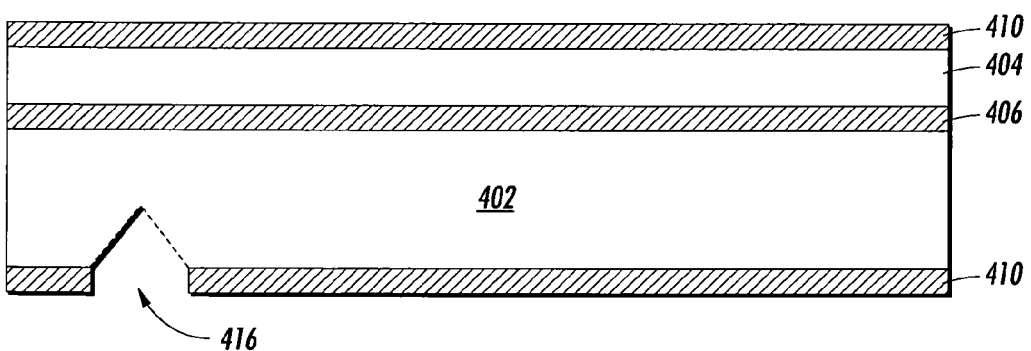

The silicon substrate 402 is then etched, for example in a KOH solution, to create a triangular or trapezoidal hole 416 in the silicon substrate 402, as shown in FIG. 30. An edge of the hole 416 is used as a reference for subsequent photolithographic steps of the process that require precise alignment to the <110> direction of the silicon substrate 402.

Figure 31:
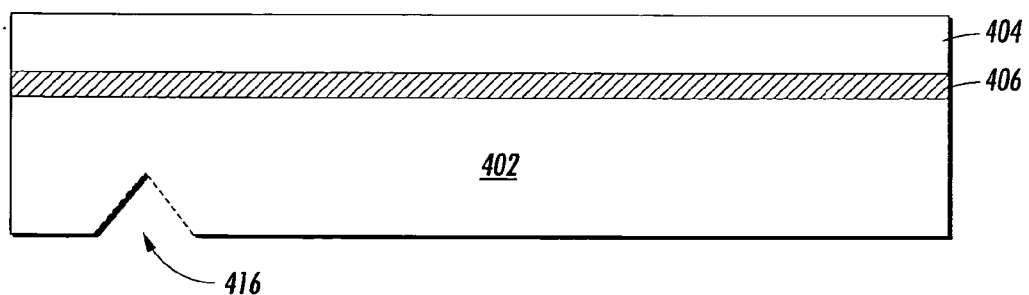

As shown in FIG. 31, the first mask layer 410 is then removed, for example, using a wet etch.

Figure 32:
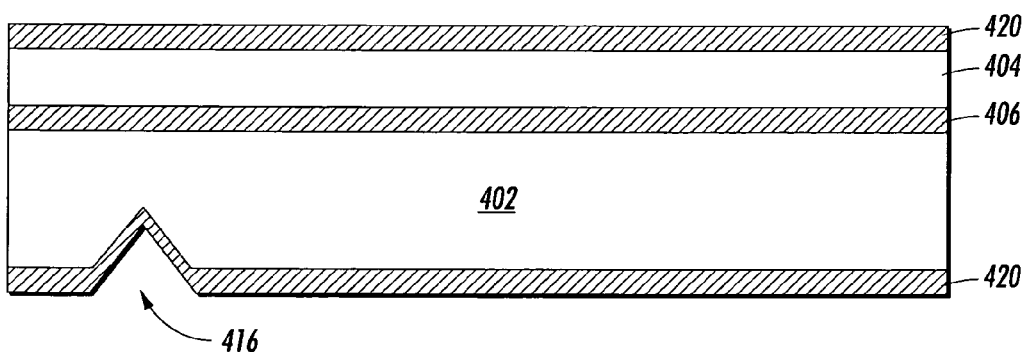

A second mask layer 420, such as an oxide, is deposited, for example by low pressure chemical vapor deposition (LPCVD), onto the etched silicon substrate 402 and onto the single-crystal-silicon layer 404, as shown in FIG. 32. The second mask layer 420 may be, for example, approximately 0.25 micron thick. The second mask layer 420 serves to protect the etched silicon substrate 402 during a subsequent etch of the single-crystal-silicon layer 404.

Figure 33:
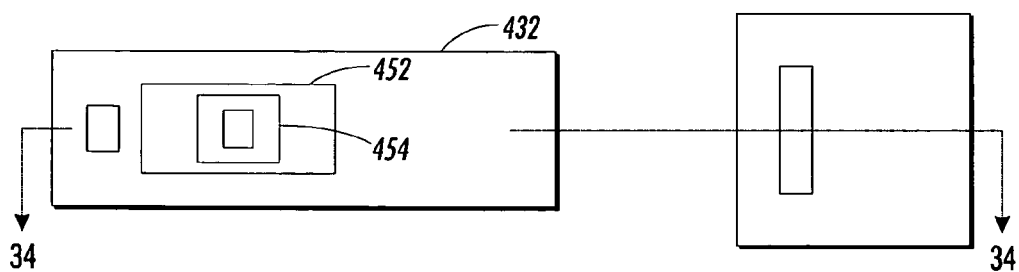
Figure 34:
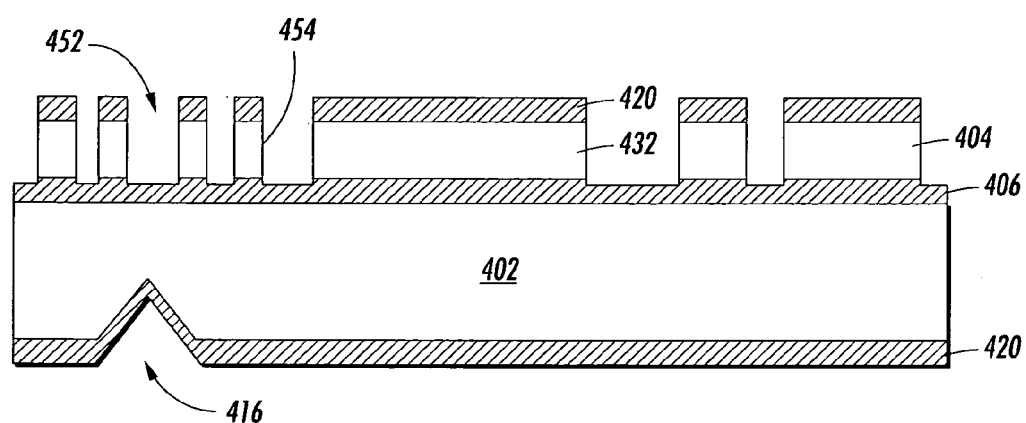

The second mask layer 420 is then patterned, for example using a photoresist (not shown). As shown in FIGS. 33 and 34, the single-crystal-silicon layer 404 is etched, for example using a dry etch such as a reactive ion etch, with the photoresist and/or the second mask layer 420 as masking layers. As shown, the etching may over-etch approximately 0.15 microns into the insulator layer 406.

Figure 35:
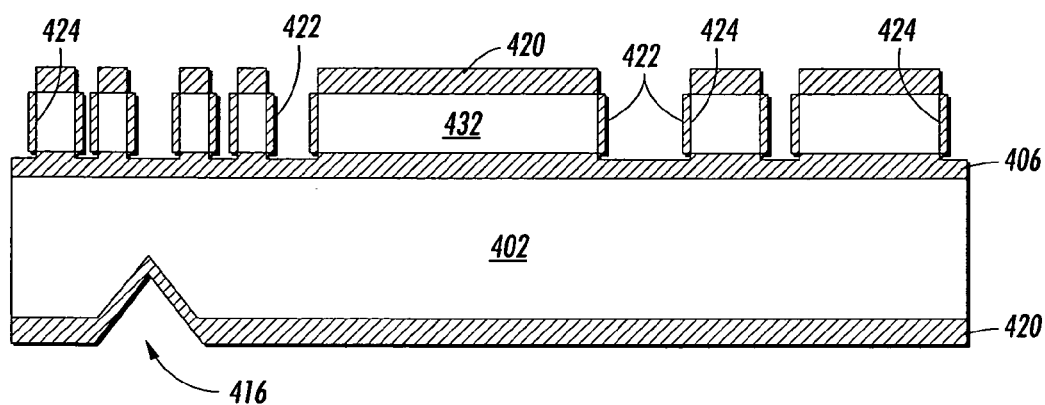
Figure 36:
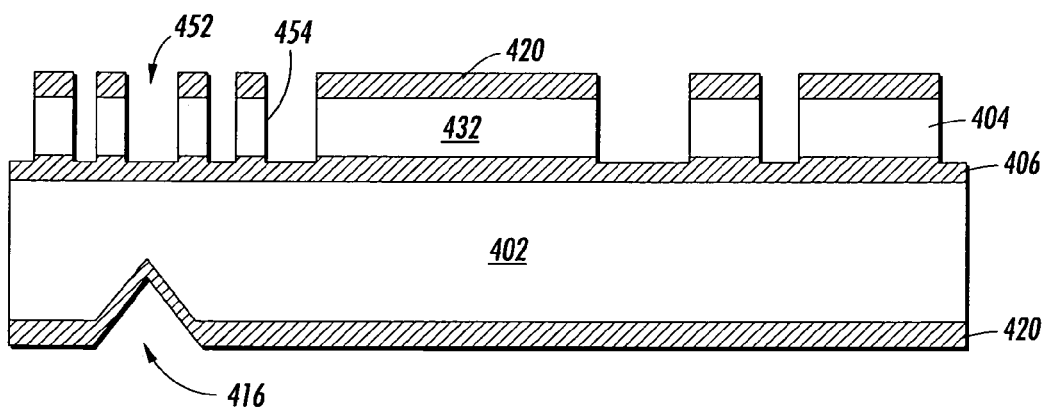

In order to improve the quality of the structures in the single-crystal-silicon layer 404, a dry oxidation may be performed to grow a thin oxide 422, for example approximately 1000 Angstroms thick, on sidewalls 424, as shown in FIG. 35. As shown in FIG. 36, the thin oxide 422 is then removed, for example, using a wet etch such as a buffered HF etch for 2 minutes. This wet etch will also remove approximately 2000 additional Angstroms of the insulator layer 406.

Figure 37:
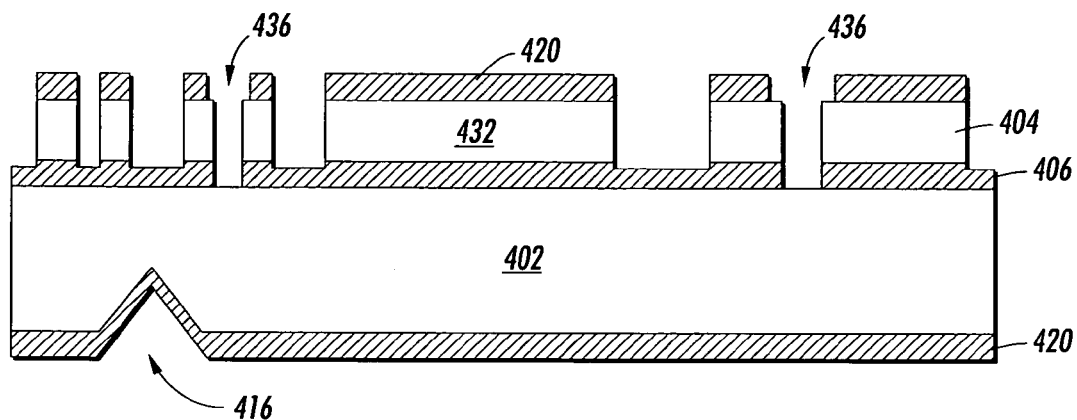

A third mask layer (not shown), such as an oxide, is deposited, for example by low pressure chemical vapor deposition (LPCVD), onto the etched single-crystal-silicon layer 404. As shown in FIG. 37, anchor holes 436 are etched, for example using a wet etch, to remove the insulator layer 406.

Figure 38:
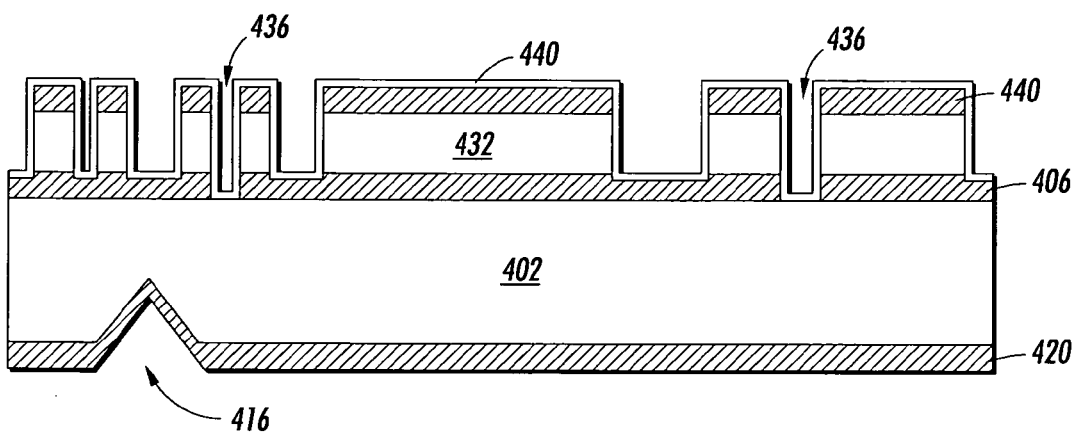

A nitride layer 440 is then deposited, for example by low pressure chemical vapor deposition (LPCVD), as shown in FIG. 38. The nitride layer 440 provides an anti-reflection coating for the waveguides of the switch and also serves as a masking layer for a subsequent etch of a V-groove.

Figure 39:
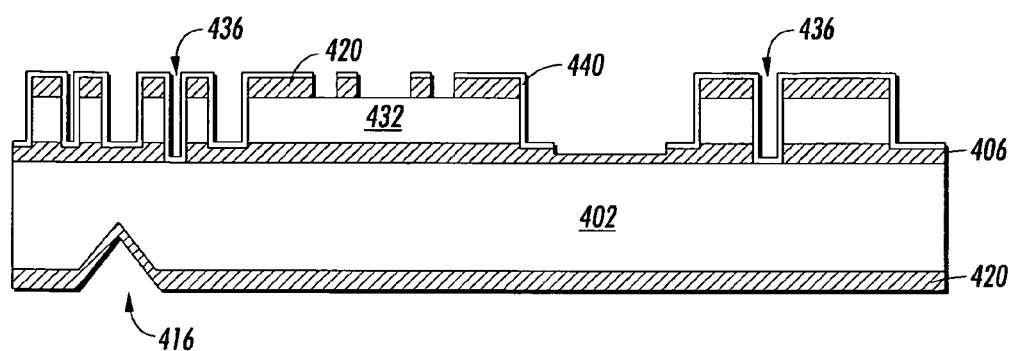

A fourth mask layer (not shown), such as a photoresist, is deposited and patterned over the nitride layer 440. The patterned photoresist is used to define ridge waveguides and an opening for a V-groove, as shown in FIG. 39, whereby exposed portions of the nitride layer 440 and the third mask layer 430 and a thin portion, about 500 Angstroms, of the insulator layer 406 are etched away.

Figure 40:
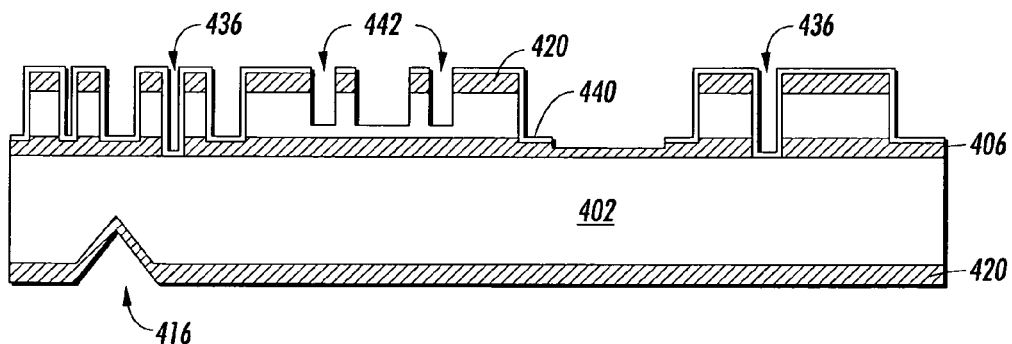

A photoresist (not shown) along with the remaining nitride layer 440 and the remaining third mask layer 430 are used as a mask to define trenches in the single-crystal-silicon layer 304 that form ridge waveguides 442, as shown in FIG. 40, in conjunction with a dry etch, such as a reactive ion etch. Because the insulator layer 406 is much thicker than the third mask layer 430, a layer of about 4000 Angstroms of the insulator layer 406 will remain after the reactive ion etch. Thus, the silicon substrate 402 is not attacked by the reactive ion etch.

Figure 41:
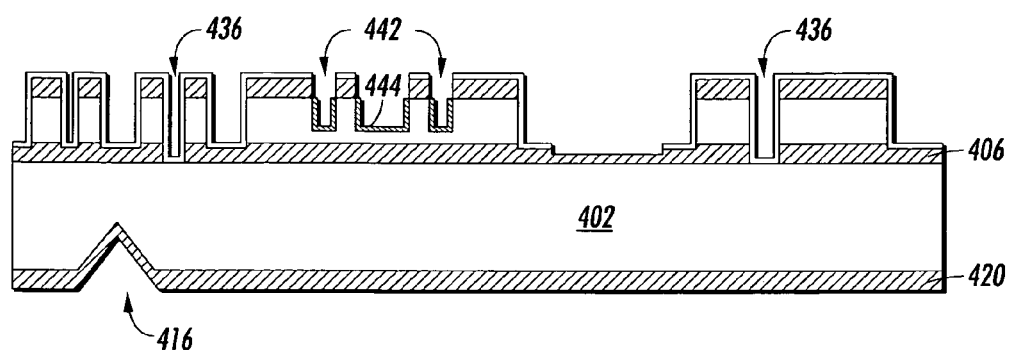

In order to improve the quality of the ridge waveguides 442 in the single-crystal-silicon layer 404, a dry oxidation may be performed to grow another thin oxide 444, for example approximately 1000 Angstroms thick, on sidewalls 446, as shown in FIG. 41. As above, the thin oxide 444 is then removed, for example, using a wet etch such as a buffered HF etch for 2 minutes.

Figure 42:
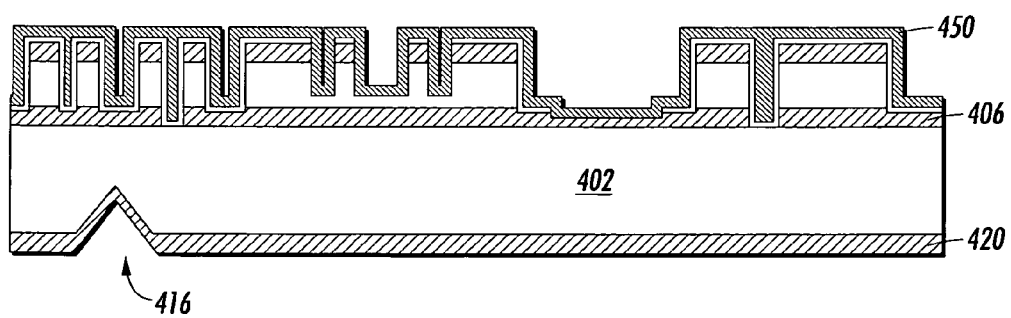
Figure 43:
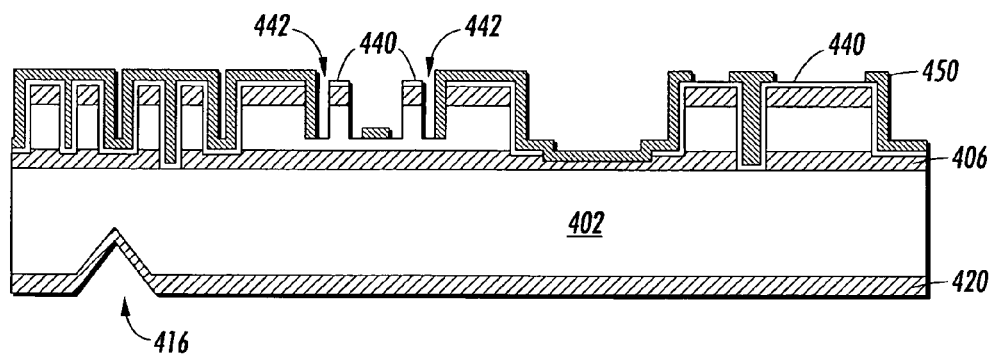
Figure 44:
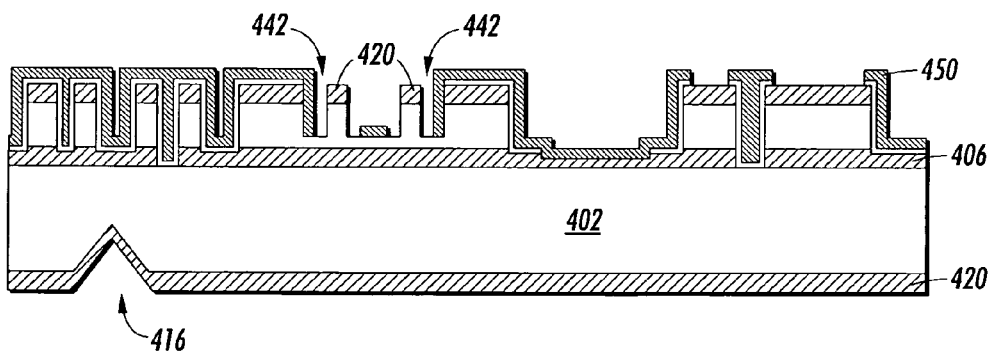

Next, as shown in FIG. 42, a fifth mask layer 450, such as an oxide, is deposited, for example by low pressure chemical vapor deposition (LPCVD), as a mask for a subsequent wet etch. The fifth mask layer 450 may be approximately 5000 Angstroms thick. The fifth mask layer 450 is patterned, for example using a photoresist, as shown in FIG. 43. The fifth mask layer 450 serves as a mask for removing the nitride layer 440 with a wet etch, for example, in phosphoric acid, as shown in FIG. 44. In particular, this wet etch removes the nitride layer 440 from the ridge waveguides 442 to avoid increases in optical loss from curling of the nitride layer 440.

Figure 45:
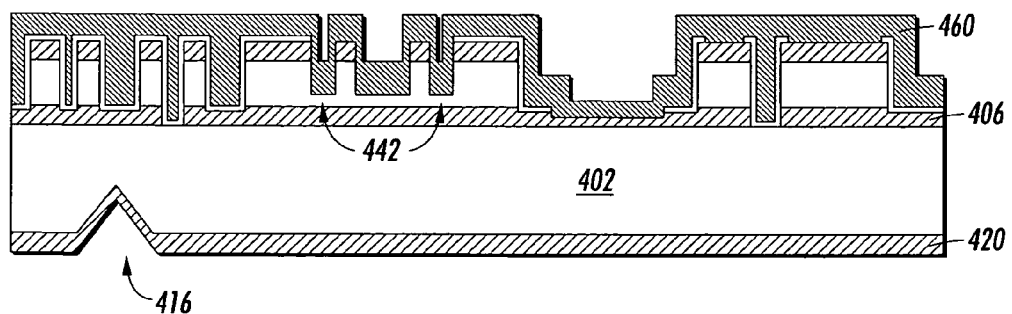
Figure 46:
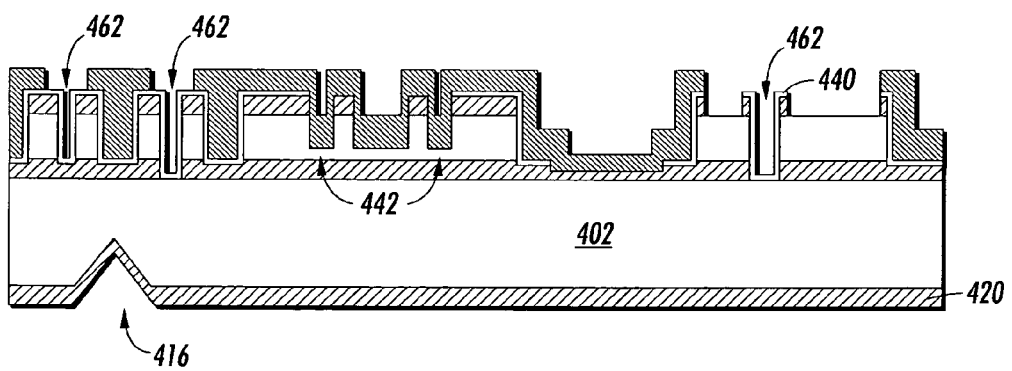
Figure 47:
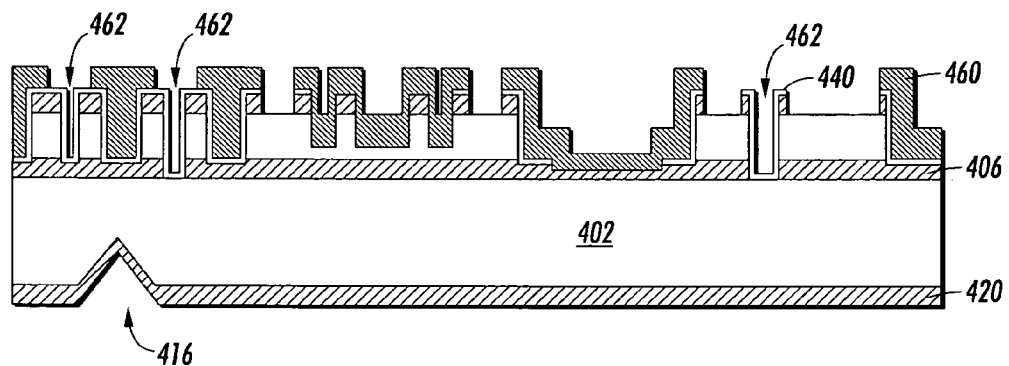

A sixth mask layer 460, such as a 0.3 micron LPCVD deposited undoped oxide layer and a 1.7 micron sacrificial phosphosilicate-glass layer, is formed, as shown in FIG. 45. The undoped oxide layer helps prevent doping of the ridge waveguides 442 during subsequent high temperature annealing. The sixth mask layer 460 is patterned using a photolithographic process so that anchor holes 462 are defined and opened during a wet etch, as shown in FIG. 46. Then, as shown in FIG. 47, a photoresist (not shown) is used as a mask to define vias that are opened by a dry etch, such as a reactive ion etch.

Figure 48:
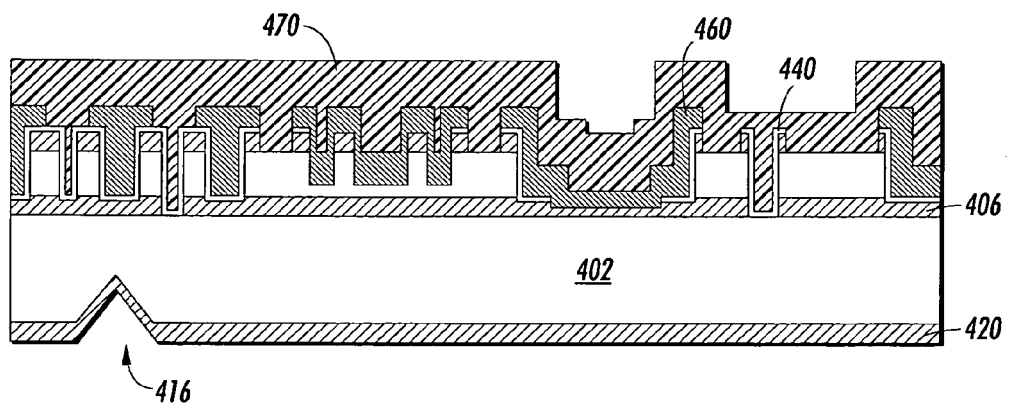
Figure 49:
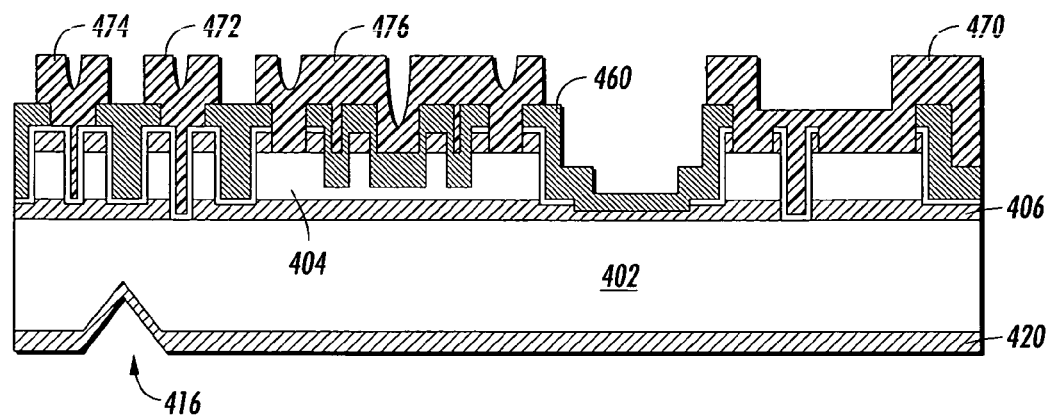
Figure 50:
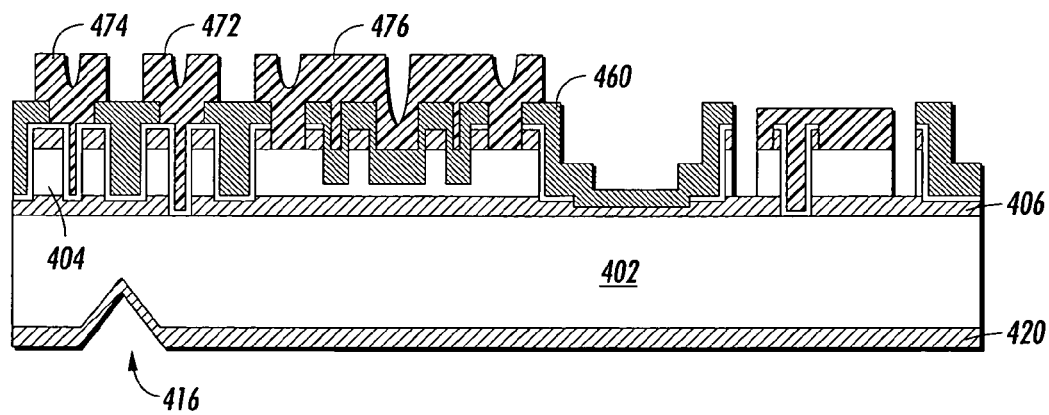

A layer of structural material 470, such as polysilicon, is then deposited, doped and annealed, as shown in FIG. 48. The layer of structural material 470 may be, for example, 3 microns thick. Using one or more suitable mask layers (not shown), microstructures such as an anchor stop 472, a bumper 474 and/or a bridge 476 may be shaped in the layer of structural material 470 by one or more etches. For example, one mask may be used with a dry etch to cut through the layer of structural material 470, while another mask may be used with another etch to cut through the layer of structural material 470 and the single-crystal-silicon layer 404, as shown in FIGS. 49 and 50, respectively. Using two etching steps will help to minimize undesirable lateral etch on the microstructures formed in the layer of structural material 470. For example, the microstructures such as the anchor stop 472, the bumper 474 and/or the bridge 476 may be fabricated with high accuracy. Using a single etch to cut through layers of different thickness may result in an over-etch on the thinner areas.

Figure 51:
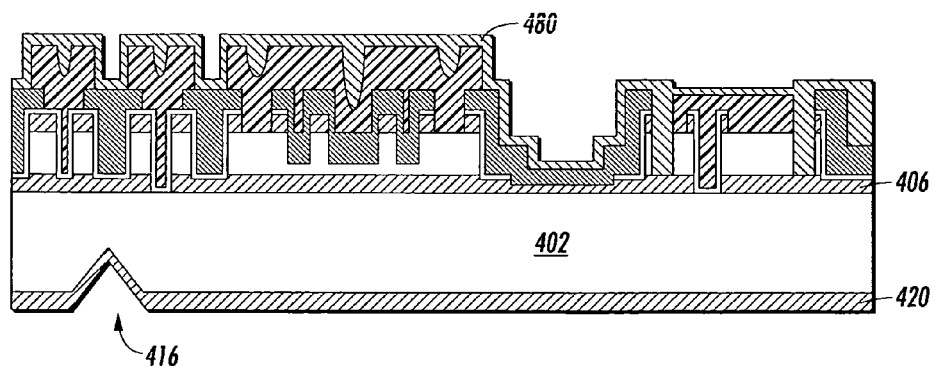
Figure 52:
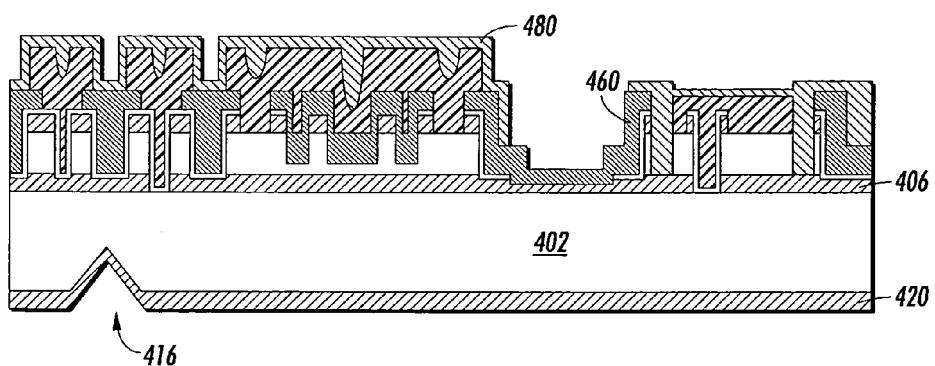
Figure 53:
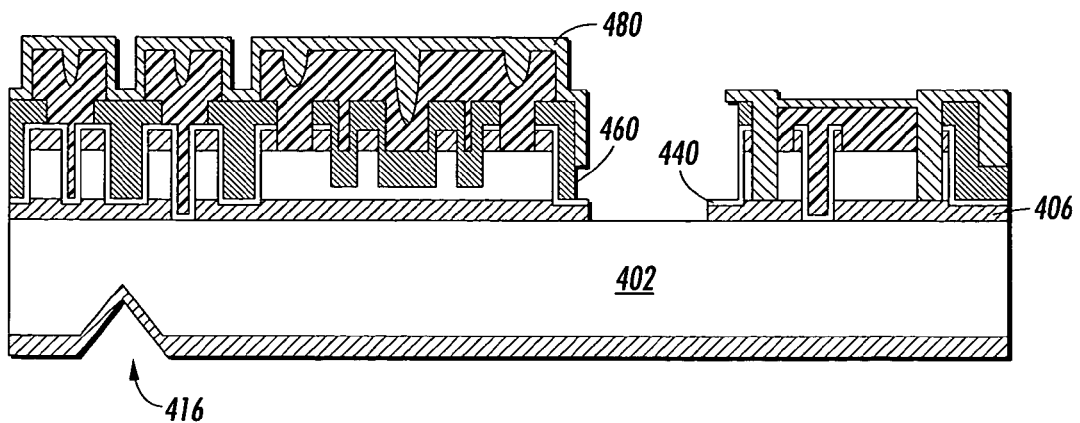

As shown in FIG. 51, a layer of protective material 480, such as silicon nitride, is deposited as a mask to protect the polysilicon and single-crystal silicon microstructures from a subsequent etch. The layer of protective material 480 is patterned using a mask (not shown), such as a photoresist, and selectively removed, for example using a dry etch, as shown in FIG. 52. Then, the sixth mask layer 460 and the remaining insulator layer 406 are removed using a wet etch to expose the silicon substrate 402 where a V-groove is to be formed, as shown in FIG. 53. it should be noted that the alignment of the photoresist is not critical because the opening for the V-groove is primarily defined by the nitride layer 440 already patterned.

Figure 54:
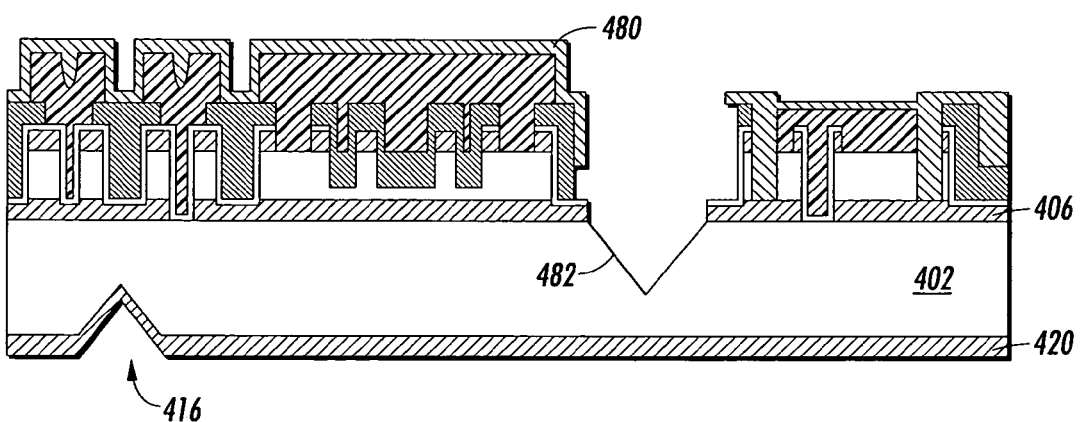
Figure 55:
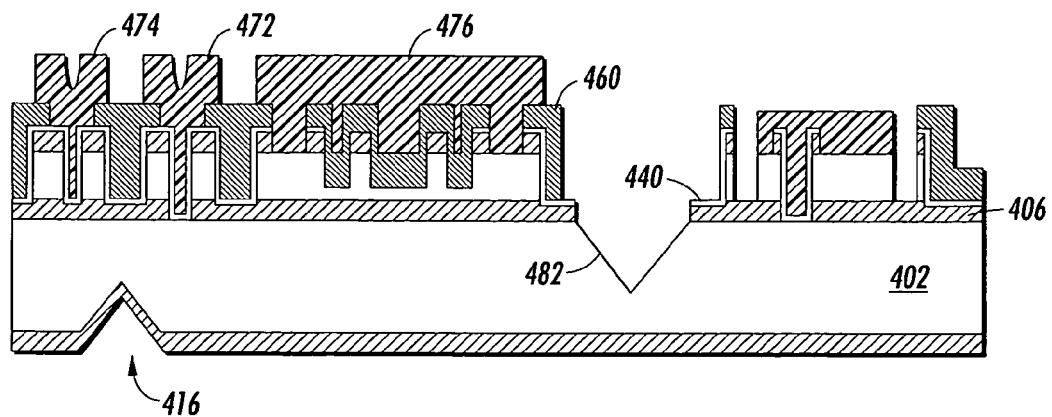

As shown in FIG. 54, a V-groove 482 is etched into the silicon substrate 402, for example, using a KOH etch. After the KOH etch, the layer of protective material 480 is removed, as shown in FIG. 55, using a wet etch, for example in phosphoric acid.

Figure 56:
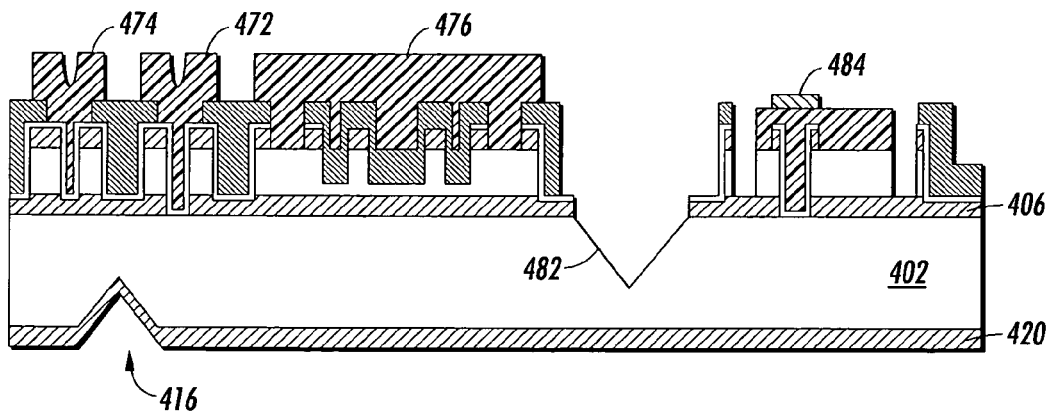
Figure 57:
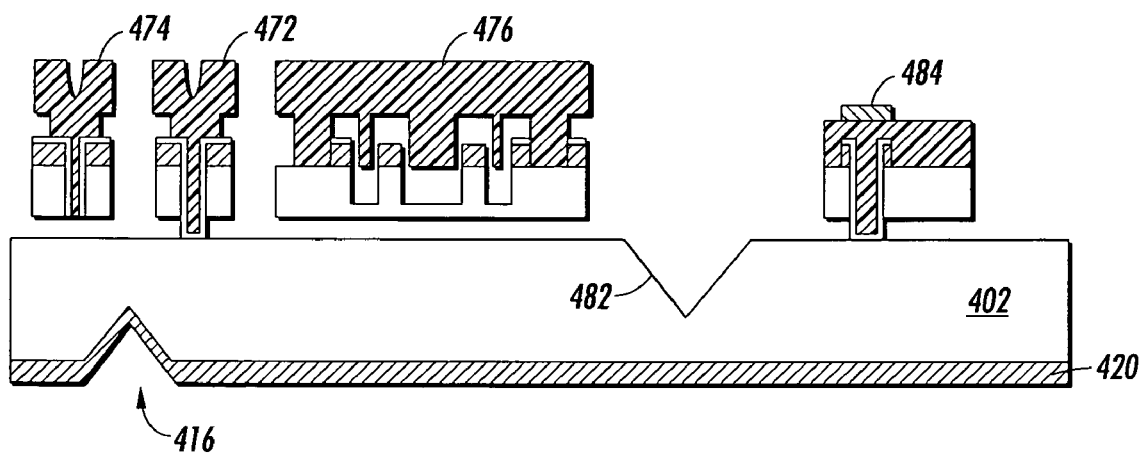

A thick photoresist (not shown) is then deposited and patterned using a lithographic process to form a mask. The mask defines one or more bonding pads 484, as shown in FIG. 56, that are formed, for example, with gold using a sputtering and lift-off process. Finally, a wet etch, for example in hydrofluoric acid, is used to release the microstructures, as shown in FIG. 57.

In a modification of this fabrication process, one of the mask layers may be eliminated to reduce the cost and time required for the process. This modification follows the previous process through the removal of the thin oxide 422 using a wet etch as shown in FIG. 36.

Figure 58:
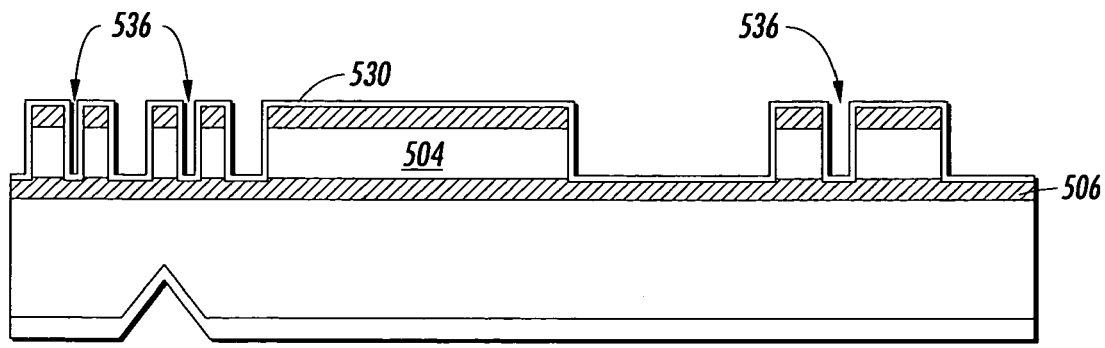
FIGS. 58–68 illustrate a modification of the more detailed exemplary embodiment of FIGS. 27–57 according to this invention.
Figure 59:
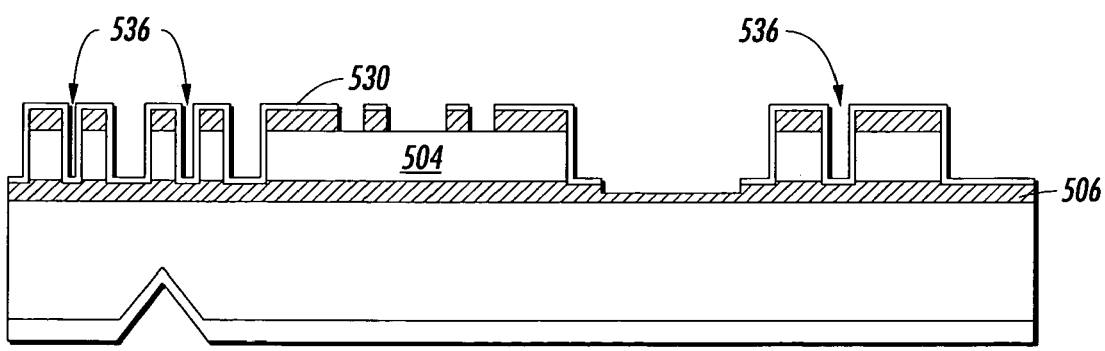

A third mask layer 530 is deposited, for example by low pressure chemical vapor deposition (LPCVD), onto the etched single-crystal-silicon layer 504 to define anchor holes 536. In this case, the third mask layer 530 is a nitride layer, as shown in FIG. 58. The nitride layer provides an anti-reflection coating for the waveguides of the switch and also serves as a masking layer for a subsequent etch of a V-groove. The third mask layer 530 also is used to define ridge waveguides and an opening for a V-groove, as shown in FIG. 59, whereby exposed portions of the third mask layer 530 and a thin portion, about 500 Angstroms, of the insulator layer 506 are etched away.

Figure 60:
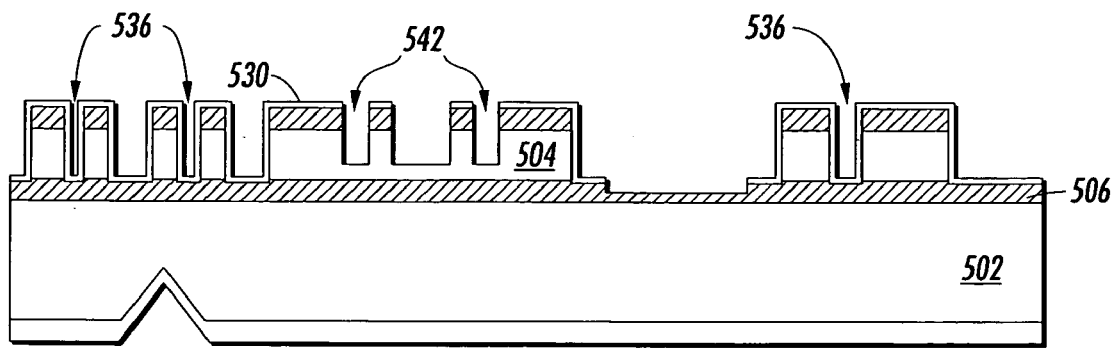

A photoresist (not shown) along with the remaining third mask layer 530 are used as a mask to define trenches in the single-crystal-silicon layer 504 that form ridge waveguides 542, as shown in FIG. 60, in conjunction with a dry etch, such as a reactive ion etch. Because the insulator layer 506 is much thicker than the third mask layer 530, a layer of about 4000 Angstroms of the insulator layer 506 will remain after the reactive ion etch. Thus, the silicon substrate 502 is not attacked by the reactive ion etch.

Figure 61:
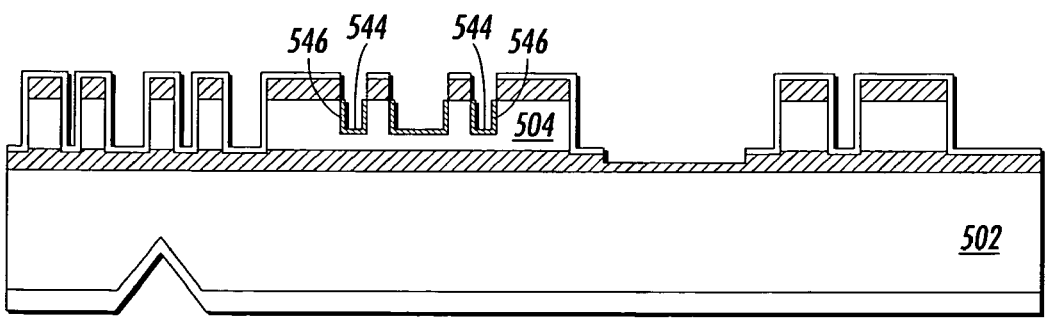

In order to improve the quality of the ridge waveguides 542 in the single-crystal-silicon layer 504, a dry oxidation may be performed to grow another thin oxide 544, for example approximately 1000 Angstroms thick, on sidewalls 546, as shown in FIG. 61. As above, the thin oxide 544 is then removed, for example, using a wet etch such as a buffered HF etch for 2 minutes.

Figure 62:
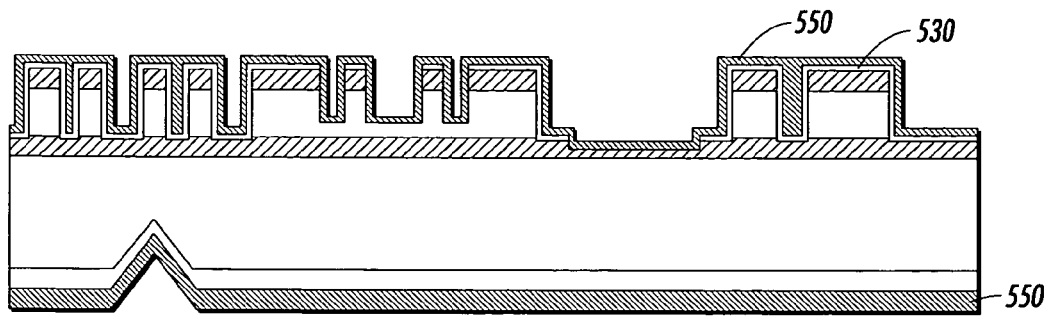
Figure 63:
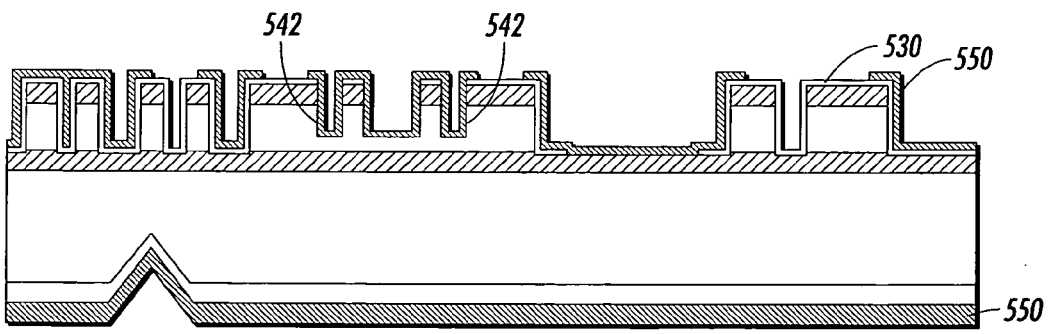
Figure 64:
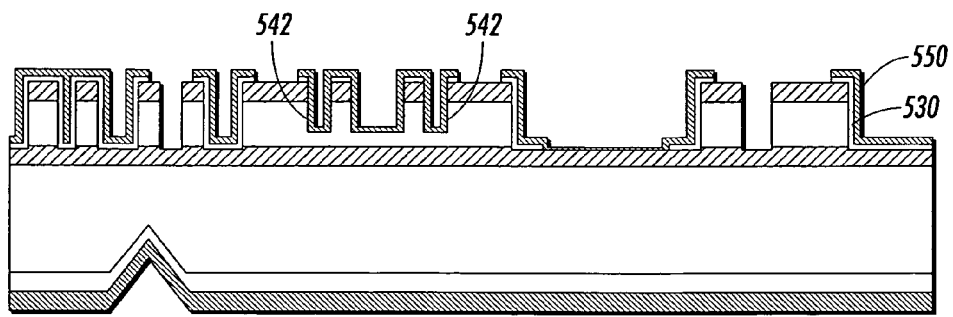

Next, as shown in FIG. 62, a fourth mask layer 550, such as an oxide, is deposited, for example by low pressure chemical vapor deposition (LPCVD), as a mask for a subsequent wet etch. The fourth mask layer 550 may be approximately 5000 Angstroms thick. The fourth mask layer 550 is patterned, for example using a photoresist, as shown in FIG. 63. The fourth mask layer 550 serves as a mask for removing the nitride layer 530 with a wet etch, for example, in phosphoric acid, as shown in FIG. 64. In particular, this wet etch removes the nitride layer 530 from the ridge waveguides 542 to avoid increases in optical loss from curling of the nitride layer 530.

Figure 65:
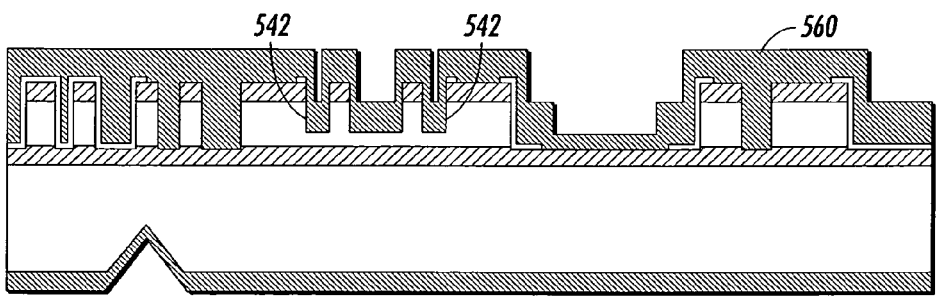
Figure 66:
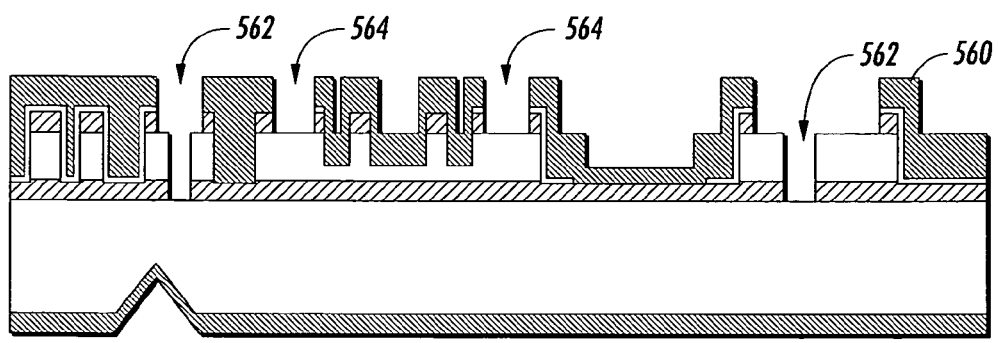
Figure 67:
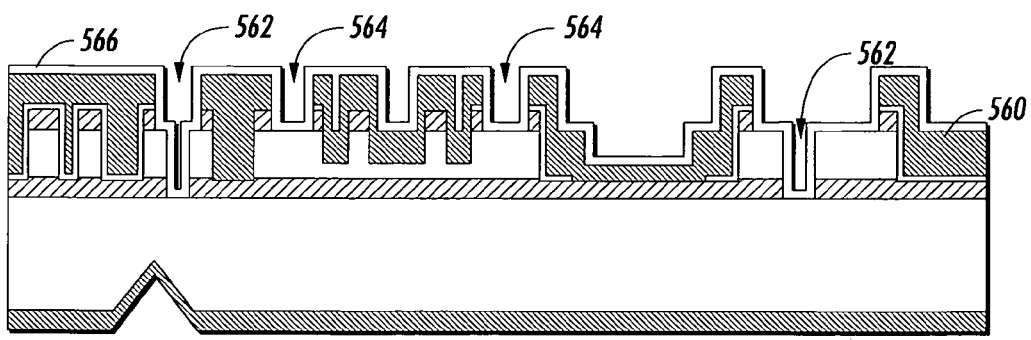
Figure 68:
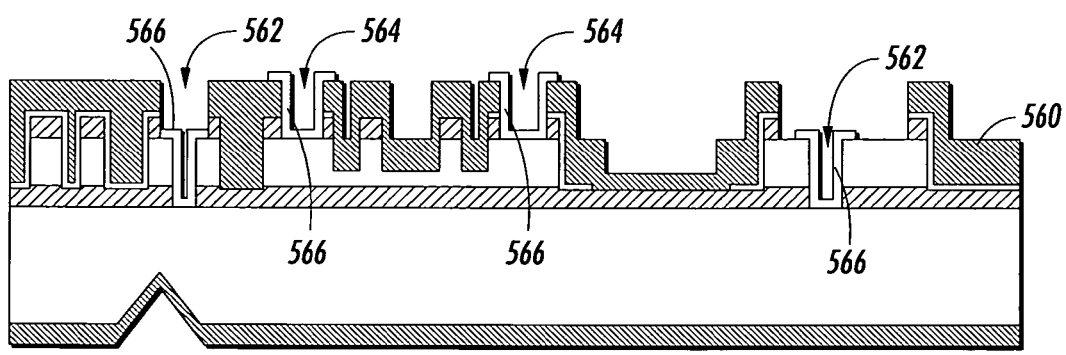

A fifth mask layer 560, such as a 0.3 micron LPCVD deposited undoped oxide layer and a 1.7 micron sacrificial phosphosilicate-glass layer, is formed, as shown in FIG. 65. The undoped oxide layer helps prevent doping of the ridge waveguides 542 during subsequent high temperature annealing. The fifth mask layer 560 is patterned using a photolithographic process so that anchor holes 562 and vias 564 are defined and opened during a wet etch, as shown in FIG. 66. Then, as shown in FIG. 67, a layer of insulating material 566, such as a nitride, is deposited to provide insulation in the anchor holes 562 and/or the vias 564. The layer of insulating material 566 is subsequently patterned using a dry etch, as shown in FIG. 68. If necessary, an oxide layer (not shown) may be deposited on the layer of insulating material 566 for wet etching. The modified process then proceeds as described above with respect to FIGS. 48–57.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

For example, modifications such as those described in copending U.S. patent application Ser. No. 09/683,533, which is incorporated by reference in its entirety, are contemplated. Also, while techniques described above for fabricating the silicon demultiplexer, the silicon optical switches and the silicon multiplexer are particularly suitable, it should be understood that any known or later developed processing technique for silicon structures may be used. For example, conventional photolithography and etching techniques may be used.

What is claimed is:

1. A micro-optical device having an aligned waveguide switch, comprising:
   a semiconductor substrate;
   a stationary input part arranged on the semiconductor substrate, the stationary input part having a plurality of channels, and each channel being an input waveguide;
   a stationary output part arranged on the semiconductor substrate, the stationary output part having a plurality of channels, and each channel being an output waveguide;
   a movable part movably arranged on the semiconductor substrate, the movable part having a plurality of channels, and each channel being a switching waveguide, the movable part being movable relative to the stationary input and output parts;
   at least one stop block that limits movement of the movable part to align at least one of the switching waveguides with at least one of the input waveguides and at least one of the output waveguides, wherein movement of the movable part is substantially transverse; and
   at least one bumper connected to the movable part, the bumper bumping into the stop block in order to stop the movable parts,
   wherein an insulating layer is arranged between the semiconductor substrate and the stationary input part, the stationary output part and the movable part.

2. The device of claim 1, wherein the device further comprises a single-crystal-silicon layer and the stationary input part, the stationary output part and the movable part are part of the single-crystal-silicon layer.

3. The device of claim 2, wherein the at least one stop block is formed on the semiconductor substrate.

4. The device of claim 2, wherein the at least one stop block is made of polysilicon.

5. The device of claim 4, wherein the bumper is made of polysilicon.

6. The device of claim 1, wherein the at least one stop block is made of polysilicon.

7. The device of claim 6, wherein the bumper is made of polysilicon.

8. A method for fabricating a micro-optical device having an aligned waveguide switch, comprising:
   forming a crystal layer on a semiconductor substrate;
   forming a stationary input part, a stationary output part and a movable part using the formed crystal layer;
   forming a plurality of channels in each of the stationary input part, the stationary output part and the movable part, each of the channels being a waveguide;
   forming at least one stop block that limits movement of the movable part to align at least one of the waveguides of the movable part with at least one of the waveguides of the stationary input and output parts, wherein movement of the movable part is substantially transverse;
   forming at least one bumper connected to the movable part, the bumper bumping into the stop block in order to stop the movable part; and
   forming an insulating layer on the semiconductor substrate, wherein the crystal layer is formed on the insulating layer.

9. The method of claim 8, wherein:
   forming the plurality of channels comprises defining a set of offsets between the channels of the movable part and the channels of the stationary input and output parts, and
   forming the at least one stop block comprises arranging the at least one stop block based on the set of offsets.

10. The method of claim 9, wherein forming the at least one stop block further comprises defining at least one edge of the movable part based on the set of offsets.

11. The method of claim 9, wherein forming at least one bumper connected to the movable part comprises forming the bumper based on the set of offsets.

12. The method of claim 8, wherein the forming the crystal layer comprises forming a single-crystal-silicon layer.

13. The method of claim 12, wherein forming the stationary input part, the stationary output part and the movable part comprises etching the single-crystal-silicon layer.

14. The method of claim 8, further comprising depositing a sacrificial layer on the device after forming the stationary input part, the stationary output part and the movable part.

15. The method of claim 14, further comprising depositing a polysilicon layer on the deposited sacrificial layer.

16. The method of claim 15, further comprising forming a hole in the sacrificial layer and the insulating layer.

17. The method of claim 16, further comprising forming a structural layer on the device after forming the hole in the sacrificial layer and the insulating layer.

18. The method of claim 17, further comprising patterning the structural layer to form the at least one stop block and at least a portion of the stop block is arranged in the formed hole.

19. The method of claim 18, wherein forming the structural layer comprises forming a polysilicon layer.

* * * * *

UNITED STATES PATENT AND TRADEMARK OFFICE
CERTIFICATE OF CORRECTION

| | | |
|---|---|---|
| PATENT NO. | : 6,990,265 B2 | |
| APPLICATION NO. | : 10/721849 | |
| DATED | : January 24, 2006 | |
| INVENTOR(S) | : Joel A. Kubby et al. | |

It is certified that error appears in the above-identified patent and that said Letters Patent is hereby corrected as shown below:

Column 1, line 8, insert as a new paragraph:

This invention was made with Government support under 70NANB8H4014 awarded by NIST. The Government has certain rights in this invention.

Signed and Sealed this

First Day of May, 2007

JON W. DUDAS
*Director of the United States Patent and Trademark Office*